(12) United States Patent
Abu-Rabeah et al.

(10) Patent No.: US 12,371,607 B2
(45) Date of Patent: Jul. 29, 2025

(54) POLYHALITE COMPOSITION AND METHOD FOR ENHANCED RECOVERY OF OIL

(71) Applicant: ICL EUROPE COOPERATIEF U.A., Amsterdam (NL)

(72) Inventors: Khalil Abu-Rabeah, Beer Sheva (IL); Meng Zhang, Chappaqua, NY (US); Robert Jacob Herman Stenekes, Leek (NL)

(73) Assignee: ICL EUROPE COOPERATIEF U.A., Amsterdam (NL)

( * ) Notice: Subject to any disclaimer, the term of this patent is extended or adjusted under 35 U.S.C. 154(b) by 0 days.

(21) Appl. No.: 18/718,446

(22) PCT Filed: Dec. 16, 2022

(86) PCT No.: PCT/IL2022/051343
§ 371 (c)(1),
(2) Date: Jun. 11, 2024

(87) PCT Pub. No.: WO2023/112040
PCT Pub. Date: Jun. 22, 2023

(65) Prior Publication Data
US 2025/0059433 A1 Feb. 20, 2025

Related U.S. Application Data

(60) Provisional application No. 63/398,237, filed on Aug. 16, 2022, provisional application No. 63/290,241, filed on Dec. 16, 2021.

(51) Int. Cl.
*C09K 8/592* (2006.01)

(52) U.S. Cl.
CPC .................. *C09K 8/592* (2013.01)

(58) Field of Classification Search
CPC ........... C09K 8/58; C09K 8/592; E21B 43/16; E21B 43/162; E21B 43/20; E21B 43/24;
(Continued)

(56) References Cited

U.S. PATENT DOCUMENTS

2006/0039842 A1 2/2006 Day
2017/0096376 A1* 4/2017 Farnworth ............... C05D 9/00
(Continued)

FOREIGN PATENT DOCUMENTS

CN 107922824 A 4/2018
CN 110036181 A 7/2019
(Continued)

OTHER PUBLICATIONS

Translation of FR-2880624-A1 (Year: 2006).*
(Continued)

*Primary Examiner* — Angela M DiTrani Leff
(74) *Attorney, Agent, or Firm* — AlphaPatent Associates Ltd.; Daniel J. Swirsky

(57) ABSTRACT

A liquid solution for the recovery of oil from carbonate reservoirs, the solution including a solid chemical composition including Polyhalite in a weight range of 70 to 94.9%, NaCl in a weight range of 5 to 29.9%, and $SiO_2$ in a weight range of 0.1 to 5%, the solid chemical composition being dissolved in water, which may include sea water, diluted sea water, desalinated seawater, produced water, aquifer water, river water, surface water, fresh water, or distilled water, where the solution is prepared by dissolving 1-10 grams of the solid chemical composition per liter of water.

7 Claims, 25 Drawing Sheets

(58) Field of Classification Search
CPC . E21B 43/2406; E21B 43/2408; E21B 43/241
See application file for complete search history.

(56) References Cited

U.S. PATENT DOCUMENTS

| | | |
|---|---|---|
| 2021/0130180 A1 | 5/2021 | Hadia |
| 2021/0147310 A1* | 5/2021 | Lati .......................... C05D 5/00 |

FOREIGN PATENT DOCUMENTS

| | | | |
|---|---|---|---|
| CN | 112752825 A | 5/2021 | |
| FR | 2880624 A1 * | 7/2006 | ........... C04B 14/022 |
| RU | 2169832 C1 | 6/2001 | |
| RU | 2245998 C1 | 2/2005 | |
| RU | 2329290 C1 | 7/2008 | |
| RU | 2716079 C2 | 3/2020 | |
| WO | WO-2018185706 A2 * | 10/2018 | ............. A01N 25/30 |
| WO | WO-2023079557 A1 * | 5/2023 | |

OTHER PUBLICATIONS

Russian Office Action (including English translation) issued in App. No. RU2024115366, dated Nov. 19, 2024, 12 pages.
Chinese Office Action (including English translation) issued in App. No. CN202280083360, dated Oct. 17, 2024, 16 pages.

* cited by examiner

POLYHALITE COMPOSITION AND METHOD FOR ENHANCED RECOVERY OF OIL

FIELD OF THE INVENTION

The present invention relates to the field of enhanced oil recovery (abbreviated EOR).

BACKGROUND OF THE INVENTION

Enhanced oil recovery (abbreviated EOR), also called tertiary recovery, is the extraction of crude oil from an oil field that cannot be extracted otherwise. EOR can extract 30% to 60% or more of a reservoir's oil, compared to 20% to 40% using primary and secondary recovery. According to the US Department of Energy, carbon dioxide and water are injected along with one of three EOR techniques: thermal injection, gas injection, and chemical injection.

Crude oil production from reservoirs can include up to three distinct phases: Primary, Secondary, Tertiary (EOR). The tertiary stage can be extraction of crude oil by using chemicals in the injection brine to the oil reservoir.

Carbonate reservoirs are characterized as a neutral to oil wet system. It is important to modify the carbonate reservoir surface to water wet in order to increase oil recovery.

Enhancing oil recovery system include: oil-water-solid. The composition of the injection brine is crucial for efficiency of the wettability of the carbonate surface. Carbonate reservoirs account for approximately 50% of the world's hydrocarbon reserves, with more than 60% of the oil and 40% of the gas reserves. Despite holding large reserves, the oil recovered from these reservoirs is usually lower than 30% of OOIP, thereby, making the enhanced oil recovery (EOR) potential from carbonates very attractive and high.

Carbonate reservoirs are known for being a challenging environment for oil production. The difficulties met by reservoir and production engineers are low matrix permeabilities combined with natural fractures, and unfavorable wettability as their wettability usually falls within the neutral to oil-wet range, which limits capillary forces and reduce the potential for water imbibition into the rock matrixes during water injection. All these conditions can lead to water fingering, early water breakthrough and low oil recovery rates.

Wettability in carbonates is highly influenced by the presence of polar organic components (POC) in crude oil, where the acidic components are more important than the basic components. The POC components are quantified with the acid number (AN) and base number (BN). A reduction in water-wetness was observed when initially, very water-wet carbonate cores were exposed to crude oils with increasing acid number (AN). The impact of AN on carbonates wettability effect has been confirmed by other researchers. It is also important to note that the brine pH in carbonates is buffered to slightly alkaline conditions. Therefore, the species driving the wettability of the rock surfaces are dissociated carboxilyc acids and non-protonated bases.

The initial wetting of a carbonate reservoir is established when negatively charged carboxylates adsorb onto positively charged carbonate pore surfaces. This will happen during the oil migration into the reservoir. Reservoir temperature can affect the crude oil chemical composition due to decarboxylation processes that take place at high temperatures. These processes decrease the AN of the crude oil. Therefore, a higher water-wetness observed in a carbonate reservoir, can be correlated to crude oils with low AN or high temperature reservoirs.

A water based EOR method that can contribute with a wettability alteration towards more water-wet state is very important in heterogenous reservoirs. Increased capillary forces will promote spontaneous imbibition of brine from fractures into the matrix and mobilize trapped oil. Delayed water breakthrough by taking benefit of reservoir heterogeneity is highly valuable in the pursuit for increased oil production from carbonate reservoirs. According to some embodiments, smart Water is a method that meets all these requirements, and it is only prepared by changing the ionic composition of the injection water.

A well-known smart water EOR effect has been observed in natural fractured chalk fields in the North Sea by injecting seawater. The wettability alteration is induced by the specific ions present in seawater, calcium ($Ca^{2+}$), magnesium ($Mg^{2+}$), and sulphate ($SO_4^{2-}$). The wettability alteration is induced by the specific ions present in seawater, calcium, magnesium, and sulphate. The catalyst for this process was identified to be the sulphate present in SW, and calcium appeared to be also an important ion that is able to co-adsorb on the chalk surface to facilitate the process of wettability alteration. Magnesium ions seemed to be relevant at high temperatures, where it can be exchanged with calcium ions from the chalk surface, making more calcium ions available in the bulk fluid to subsequently impacting positively on the EOR effect

BRIEF DESCRIPTION OF THE FIGURES

(FIG. 5a), and (b) performed at 90° C. (FIG. 5b), in accordance with some demonstrative embodiments.

(FIG. 17a), and (b) at 90° C. (FIG. 17b), using DWOT at an injection rate of 0.2 ml/min followed by DW1T, in accordance with some demonstrative embodiments.

SUMMARY OF THE INVENTION

Figure 1A:
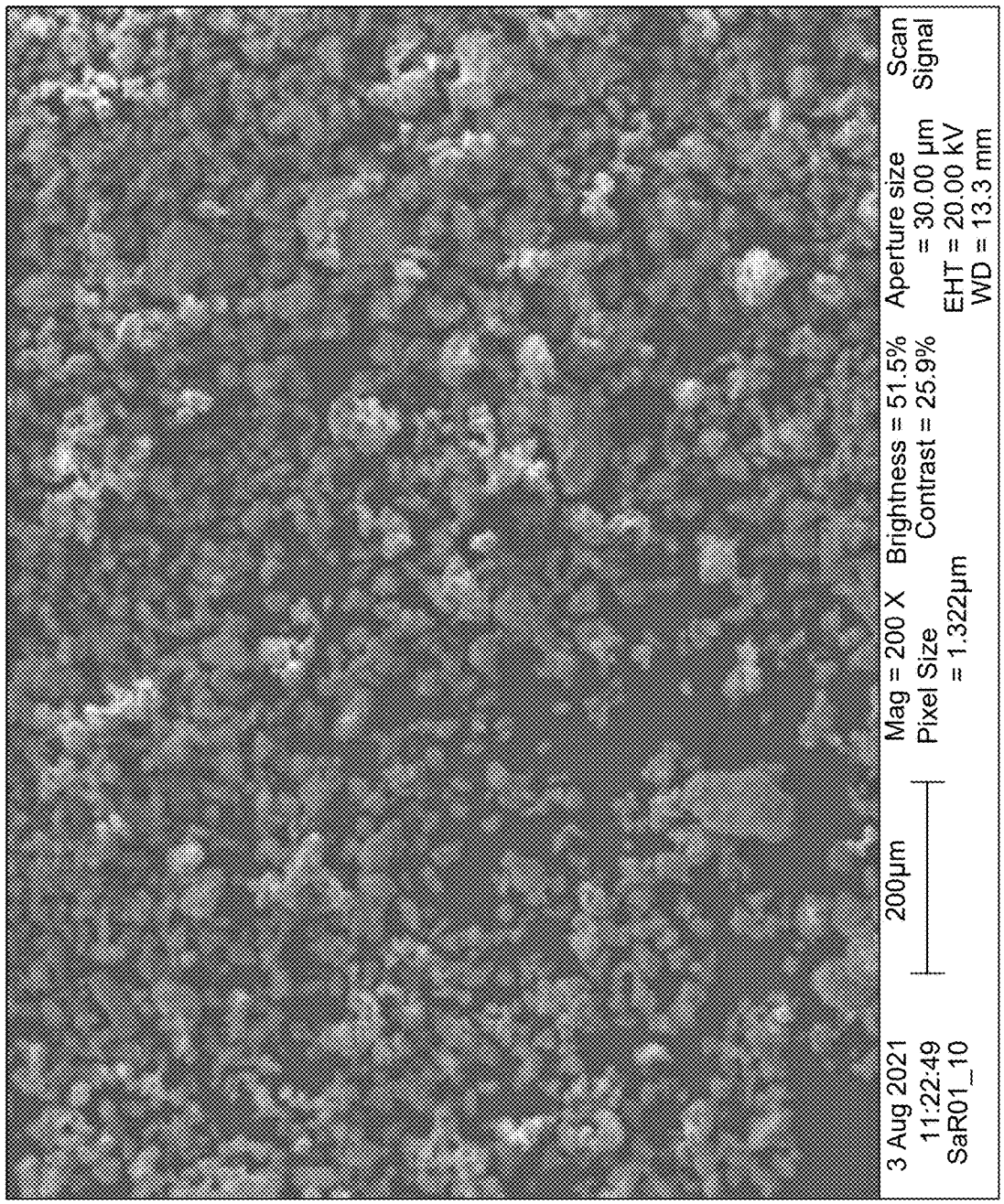
FIGS. 1a-1d show SEM images of a Polyhalite sample at different magnifications 200× (FIG. 1a), 1000× (FIG. 1b), 5000× (FIG. 1c), and 10000× (FIG. 1d), in accordance with some embodiments.
Figure 1B:
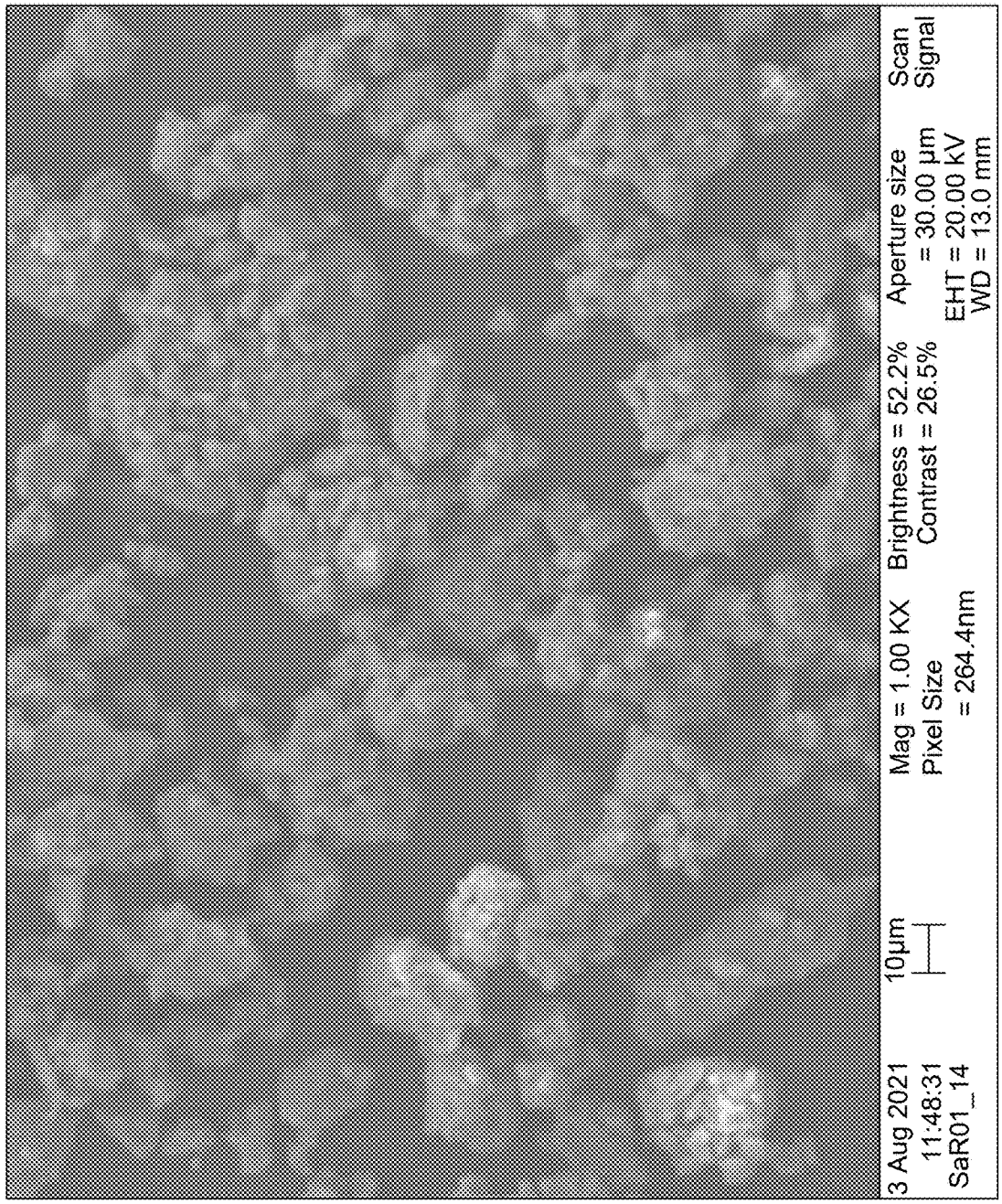
Figure 1C:
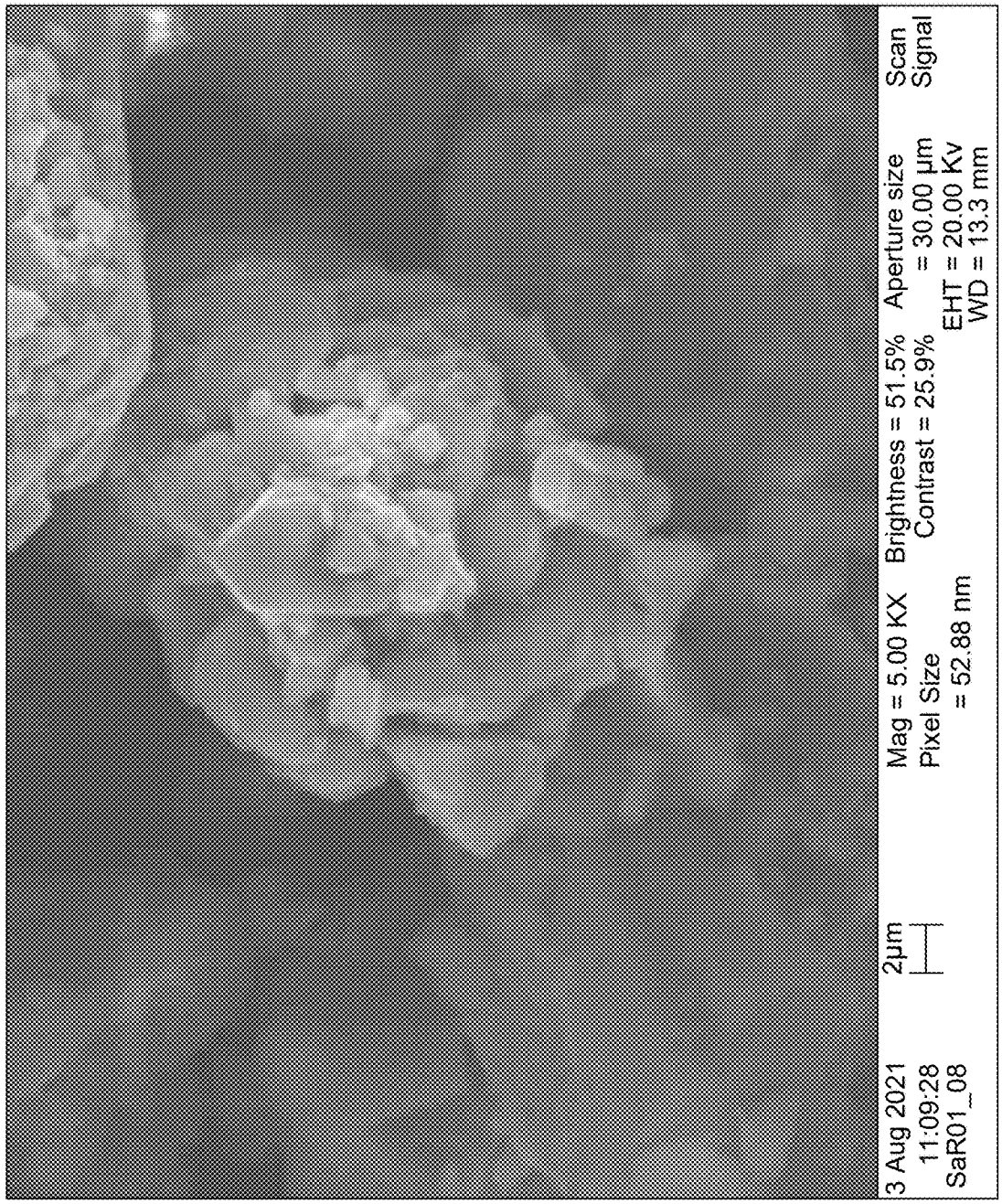

According to some demonstrative embodiments, there is provided herein a liquid solution for the recovery of oil from carbonate reservoirs comprising a solid chemical composition comprising Polyhalite in a % weight range of 70 to 99.5; NaCl in a % weight range of 5 to 30; $SiO_2$ in a % weight range of 0.1 to 5; and injected water selected from the group including sea water, diluted sea water, desalinated seawater, produced water, aquifer water, river water, surface water, fresh water, distilled water or a combination of thereof; wherein said solid chemical composition is dissolved in said injected water in an amount of 1-10 grams of said solid chemical composition per 1 liter of said injected water. According to some embodiments, the injected water may be a low salinity water selected from the group including surface water, fresh water, distilled water or a combination of thereof.

According to some embodiments, the low salinity water may include total dissolvable solids (TDS) in a concentration of 0.4% or less.

According to some embodiments, the solution of the present invention may include a dissolved chloride concentration of less than 1500 mg/L and a dissolved sodium concentration of less than 1000 mg/L, preferably, the dissolved chloride concentration is less than 600 mg/L and the dissolved sodium concentration is less than 300 mg/L.

According to some embodiments, the solution may further include bivalent salts of magnesium sulphate or calcium sulphate.

According to some embodiments, there is provided herein a method for recovering oil from a carbonate reservoir comprising dissolving 1-10 grams of a solid chemical composition in 1 liter of low salinity injected water comprising a TDS of 0.4% or less to yield a recovery solution; injecting said recovery solution to said reservoir to facilitate oil recovery; and wherein said solid chemical composition comprising Polyhalite in a % weight range of 70 to 99.5; NaCl in a % weight range of 5 to 30; $SiO_2$ in a % weight range of 0.1 to 5; According to some embodiments, the method may further include heating the recovery solution to a temperature of between 30-130 degrees prior to injecting the solution to the reservoir.

DETAILED DESCRIPTION OF THE INVENTION

According to some demonstrative embodiments there is provided herein a solution for the recovery of oil from carbonate reservoirs comprising Polyhalite and injected water selected from the group including sea water, diluted sea water, desalinated seawater, produced water, Aquifer water, river water or a combination of thereof.

According to some embodiments, the concentration of Polyhalite in the injected water may be 0.1 to 100 g/L, preferably between 1 to 10 g/L.

According to some demonstrative embodiments, there is provided herein a liquid solution for the recovery of oil from carbonate reservoirs comprising a solid chemical composition comprising Polyhalite in a % weight range of 70 to 99.5; NaCl in a % weight range of 5 to 30; $SiO_2$ in a % weight range of 0.1 to 5; and injected water selected from the group including sea water, diluted sea water, desalinated seawater, produced water, aquifer water, river water, surface water, fresh water, distilled water or a combination of thereof; wherein said solid chemical composition is dissolved in said injected water in an amount of 1-10 grams of said solid chemical composition per 1 liter of said injected water.

According to some embodiments, the injected water may be a low salinity water selected from the group including surface water, fresh water, distilled water or a combination of thereof.

According to some embodiments, the low salinity water may include total dissolvable solids (TDS) in a concentration of 0.4% or less.

According to some embodiments, the unique combination of polyhalite with low salinity water provided for a beneficial effect on the recovery of oil.

According to some embodiments, the addition of polyhalite to water, especially, low salinity water, for the recovery of oil is counter intuitive, as the dissolution of polyhalite is considered as low, and precipitation might occur, congesting the pores and preventing the effective recovery of oil.

According to some embodiments, the specific challenge of pore blocking precipitation may be prevented when the solution of the present invention includes a dissolved chloride concentration of less than 1500 mg/L and a dissolved sodium concentration of less than 1000 mg/L, preferably, the dissolved chloride concentration is less than 600 mg/L and the dissolved sodium concentration is less than 300 mg/L.

According to some embodiments, the solution may further include bivalent salts of magnesium sulphate or calcium sulphate.

According to some embodiments, there is provided herein a method for recovering oil from a carbonate reservoir comprising dissolving 1-10 grams of a solid chemical composition in 1 liter of low salinity injected water comprising a TDS of 0.4% or less to yield a recovery solution; injecting said recovery solution to said reservoir to facilitate oil recovery; and wherein said solid chemical composition comprising Polyhalite in a % weight range of 70 to 99.5; NaCl in a % weight range of 5 to 30; $SiO_2$ in a % weight range of 0.1 to 5; According to some embodiments, the method may further include heating the recovery solution to a temperature of between 30-130 degrees prior to injecting the solution to the reservoir, preferably 80-120 degrees, most preferably 90-110 degrees.

According to some demonstrative embodiments the injected water may be enriched with bivalent salt adding surface materials.

According to some demonstrative embodiments the solution may further comprise bivalent salts of magnesium sulphate and/or calcium sulphate.

According to some demonstrative embodiments, there is provided herein a method for recovering oil from carbonate reservoirs comprising adding Polyhalite to injected water; injecting the injected water to facilitate oil recovery; and wherein said injected water selected from the group including sea water, diluted sea water, desalinated seawater, produced water, Aquifer water, river water or a combination of thereof According to some embodiments, the solution of the present invention comprises bivalent ions such as Sulphate, Magnesium, Calcium in various concentrations to increase oil recovery, e.g., wherein the source of the bivalent ions may be Polyhalite.

Polyhalite is an evaporite mineral, a hydrated sulfate of potassium, calcium and magnesium with formula: $K_2Ca2Mg(SO_4)_4 \cdot 2H_2O$. Polyhalite is often used as a fertilizer since it contains four important nutrients and is low in chloride:
  48% $SO_3$ as sulfate
  14% $K_2O$
  6% MgO
  17% CaO According to some demonstrative embodiments, using Polyhalite in injected water may enhance the recovery of oil from reservoirs.

According to some embodiments, the injected water may preferably be sea water. According to some embodiments, other sulphate minerals may be added to the injected water, whether instead of Polyhalite or in addition to Polyhalite. According to some embodiments, the sulphate minerals may be selected from the group including Anhydrite, Gypsum, Kieserite, Epsomite. Glauberite, Blodite, Langbeinite, Kainite, Schonite, According to some embodiments, the use of Polyhalite in the injected water allows for the release of bivalent ions which contribute to the wettability of carbonate reservoir.

According to some embodiments, the carbonate surface has a positive charge and chloride anions attached to the surface. Decreasing sodium chloride concentration or increasing subplate ions may have an impact on oil recovery. According to some embodiments, Sulphate anions may neutralize the positive charge on the carbonate surface and allow calcium cations to detach the crude oil from the pores of the oil well walls.

According to some embodiments, Magnesium ions may also contribute to oil recovery by increasing the wettability properties of oil-carbonate surfaces. According to some embodiments, the solution of the present invention may further include additional substances that may further enhance the recovery of oil, including, for example, alkali, surfactant and/or polymer.

According to some embodiments, there is provided herein a liquid composition for the recovery of oils, (also know as "smart water"), wherein said composition comprises Polyhalite brines.

According to some embodiments, the liquid composition may preferably be a solution.

According to some embodiments, the use of a polyhalite based brine may allow for wettability alteration.

According to some embodiments, there is provided herein a use of a liquid composition comprising Polyhalite brines for the recovery of oil, wherein the use comprises using the composition in elevated temperatures, preferably between 25 to 150 degrees, most preferably, 40-120 degrees.

According to some embodiments, the specific use of polyhalite salt is preferable due to the high dissolution in seawater (SW), distilled water (DW) and different, e.g., with more than a 95% of the salts used being fully dissolved at a concentration of 5 g/l.

According to some embodiments, the solution of the present invention comprises at least three ions $Mg^{2+}$, $Ca^{2+}$ and $SO_4^{2-}$, resulting from mixing polyhalite salt with DW or SW.

According to some embodiments, the method of the present invention may be used for injection of any water or brine, such as surface (fresh water), seawater, aquifer water, formation water, and produced reservoir water, spiked with Polyhalite/polyhalite into oil-bearing formations for the purpose of recovering oil, primarily from carbonate reservoirs, but not excluding sandstone or other oil reservoirs.

According to some embodiments, one of the advantages of the present invention is that Polyhalite may easily be added to a water source on a large scale and be used for water injection

EXAMPLES

Example 1

Seawater (SW) behaves as Smart Water in chalk reservoirs at high temperatures. By modifying the SW composition, the efficiency of SW as a Smart Water could be further improved. Parametric studies have confirmed that symbiotic interactions between $Ca^{2+}$ and $SO_4^{2-}$ ions in SW promote the wettability alteration. The reactivity of these ions toward the mineral surface can be further improved by removing Na+ and Cl− ions and lowering the salinity of SW.

This example evaluates the feasibility of using Polyhalite minerals as an additive to fresh water/seawater to produce Smart Water, containing sufficient $Ca^{2+}$ and $SO_4^{2-}$ in solution.

Phase 1 Experiment Description

Solubility of the various Polyhalite samples in distilled water and seawater was tested, and the resulting concentrations of the important potential determining ions $Ca^{2+}$ and $SO_4^{2-}$ needed for the wettability alteration process was determined. Thereafter the surface reactivity of these ions toward the $CaCO_3$—chalk surface was tested and their potential for wettability alteration was determined. These test results were named phase 1, after which additional testing regime involving oil recovery tests in a phase 2 project can be conducted.

Results Summary

The results obtained are presented below, divided in types of analyses and tests.

SEM EDAX Analyses

The Polyhalite samples consisted of 4 bags of powdered material. The samples were dried prior to SEM and EDAX analyses and palladium-coated for improved image resolution.

The EDAX analysis provides an estimation of the elemental composition of the salts.

The salts appeared similar in composition, grain size and texture based on the results from the SEM EDAX analyses. The different samples were treated as uniform samples. SEM photos at different magnifications are depicted in FIGS. 1a-1d.

Figure 1D:
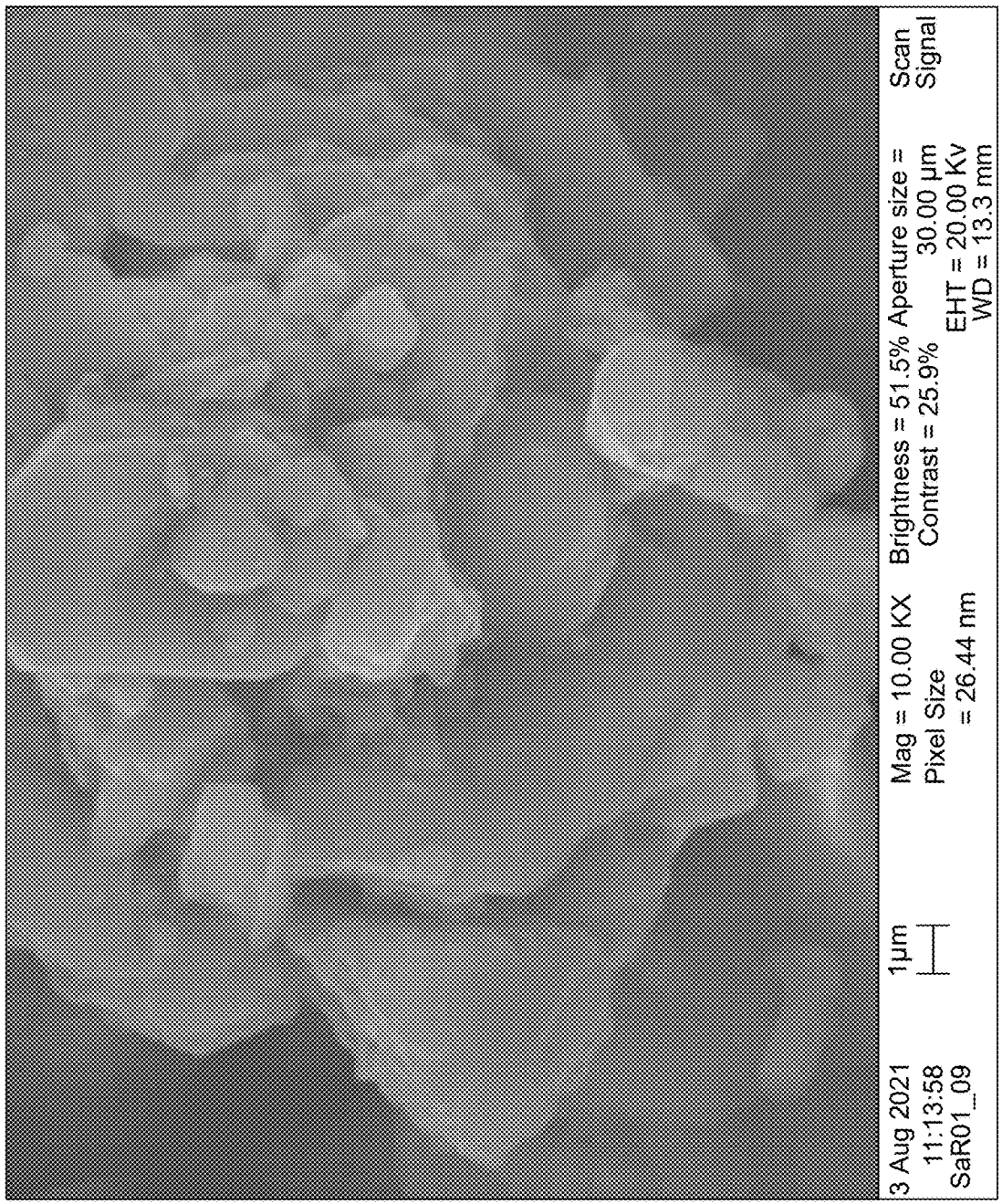

As can be seen in FIGS. 1a-1d, SEM images of a Polyhalite sample at different magnifications 200× (FIG. 1a), 1000× (FIG. 1b), 5000× (FIG. 1c), and 10000× (FIG. 1d).

The EDS spectrograms obtained for the four samples are shown in FIGS. 2a-2d.

Figure 2A:
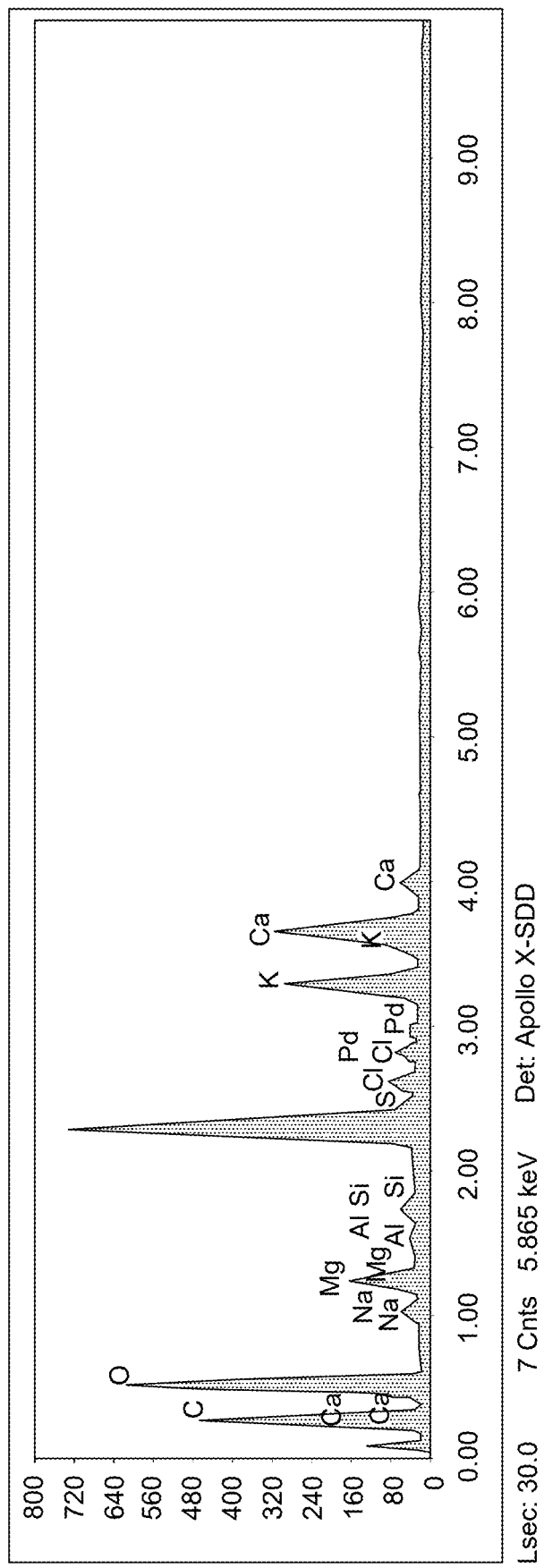
FIGS. 2a-2d show EDS spectrograms of 4 samples, Sample 1 (FIG. 2a), Sample 2 (FIG. 2b), sample 3 (FIG. 2c) and sample 4 (FIG. 2d) in accordance with some embodiments.
Figure 2B:
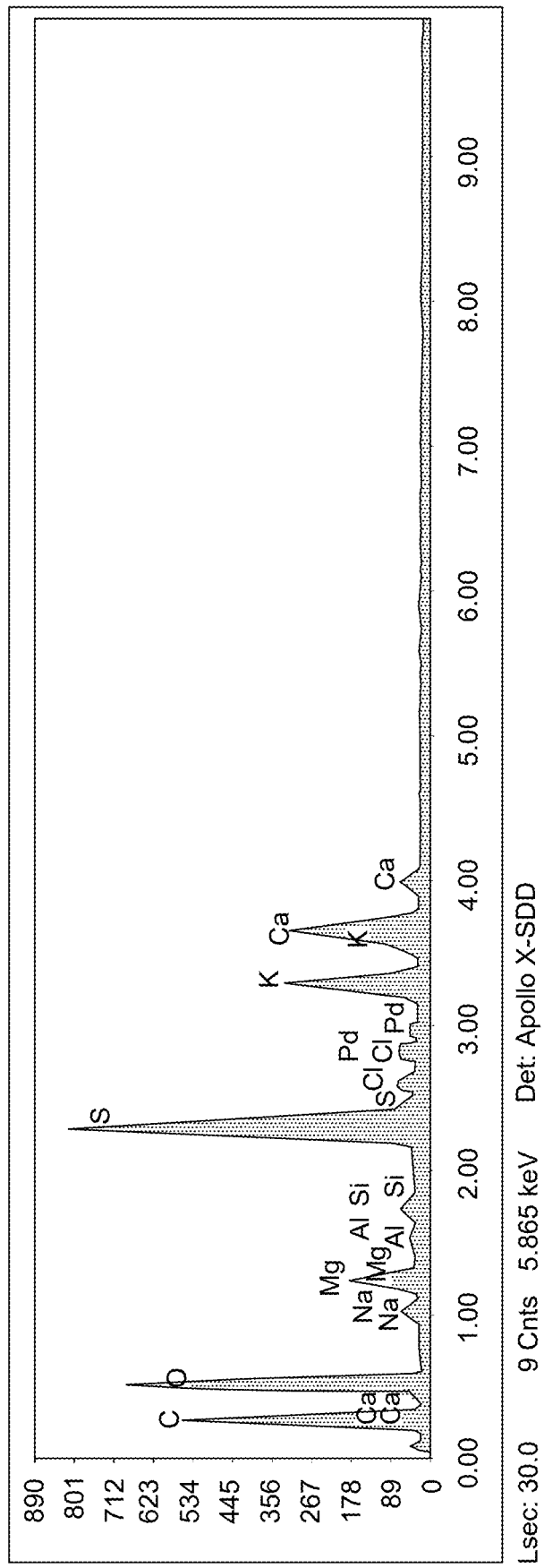
Figure 2C:
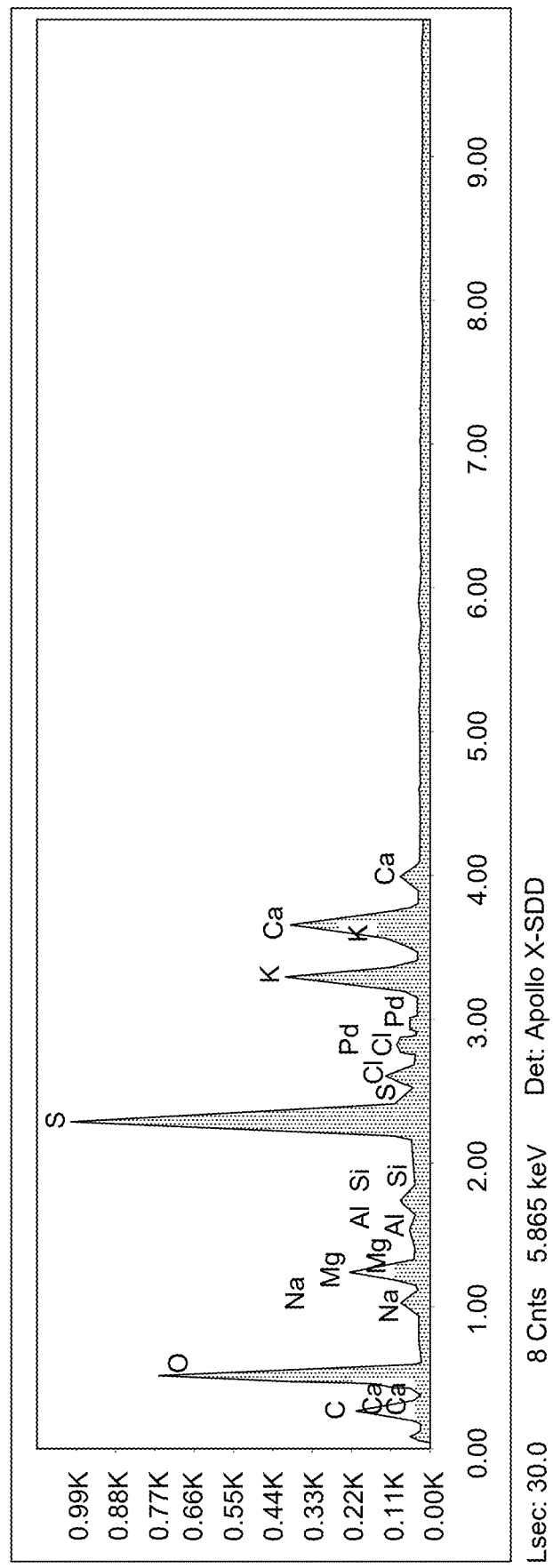
Figure 2D:
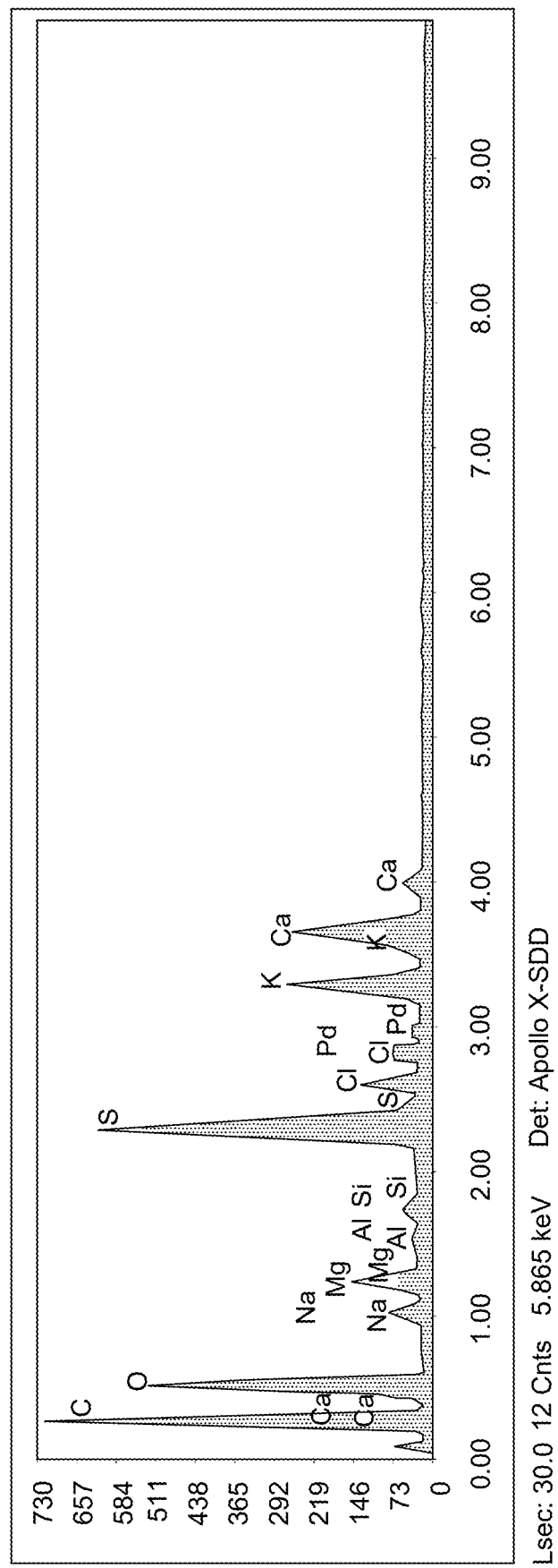

As can be seen in FIGS. 2a-2d, the EDS spectrograms are as follows Sample 1 (FIG. 2a), Sample 2 (FIG. 2b), sample 3 (FIG. 2c) and sample 4 (FIG. 2d).

Elemental analysis was carried out for both cations and anions. The results are presented below in Tables 1-4 for samples 1-4. The samples were dominated by calcium, potassium, and magnesium cations. On the anion side, sulfate was the main component detected in all samples.

TABLE 1

Cation and anion elementary analyses for sample 1.

| Cation | | Anion | |
| --- | --- | --- | --- |
| Element | Atomic | Eleme | Atomic |
| Sodium | 9.3 | Sulfur | 85.4 |
| Magnesi | 21.9 | Chlori | 14.6 |
| Aluminiu | 3.2 | | |
| Silica | 3.3 | | |
| Potassiu | 25.5 | | |
| Calcium | 36.9 | | |

TABLE 2

Cation and anion elementary analyses for sample 2

| Catio | | Anion | |
| --- | --- | --- | --- |
| Element | Atomic | Eleme | Atomic |
| Sodium | 6.3 | Sulfur | 89.4 |
| Magnesi | 23.0 | Chlori | 10.6 |
| Alumini | 1.1 | | |
| Silica | 1.0 | | |
| Potassiu | 28.0 | | |
| Calcium | 40.7 | | |

TABLE 3

Cation and anion elementary analyses for sample 3.

| Cation | | Anion | |
| --- | --- | --- | --- |
| Element | Atomic | Eleme | Atomic |
| Sodium | 7.5 | Sulfur | 83.7 |
| Magnesi | 21.1 | Chlori | 16.3 |
| Aluminiu | 0.5 | | |
| Silica | 1.1 | | |
| Potassiu | 28.2 | | |
| Calcium | 41.7 | | |

TABLE 4

Cation and anion elementary analyses for sample 4.

| Cation | | Anion | |
| --- | --- | --- | --- |
| Element | Atomic | Eleme | Atomic |
| Sodium | 5.2 | Sulfur | 75.8 |
| Magnesi | 20.9 | Chlori | 24.2 |
| Aluminiu | 1.6 | | |
| Silica | 2.0 | | |
| Potassiu | 26.8 | | |
| Calcium | 43.6 | | |

Dissolution Tests

For the dissolution tests the salts were dissolved in distilled water (DW) and seawater (SW). The brines were prepared with reagent grade chemicals and deionized water (DI) and filtrated through a 0.22 µm filter. Brine properties are shown in Table 5. Note that pH was measured after equilibration with the Polyhalite minerals.

TABLE 5

| Brine properties | | |
| --- | --- | --- |
| Ions (mM) | DW | SW |
| $[K^+]$ | 0.4 | 10 |
| $[Ca^{2+}]$ | 0.3 | 13 |
| $[Mg^{2+}]$ | 0.1 | 45 |
| $[Na^+]$ | 1.9 | 581 |
| $[Cl^-]$ | 12.5 | 525 |
| $[HCO_3]$ | — | 2.0 |
| $[SO4]^{2-}$ | 1.2 | 24 |
| pH | 7.5 | 8.0 |
| TDS (mg/L = ppm) | — | 33390 |
| Density (g/cm$^3$) | 0.999 | 1.0226 |

An initial test was run at a concentration of 100 g/L to study the general dissolution behavior of the samples. The reported values in Table 6 are average values of 5 sample measurements. DW and SW stock solutions (STD) used in the mixture were also analyzed.

TABLE 6

Ion concentrations of solubilized salts at
100 g/L, average of 5 sample measurements.

|        | Chloride (mM) | Sulfate (mM) | Sodium (mM) | Potassium (mM) | Magnesium (mM) | Calcium (mM) |
|--------|---------------|--------------|-------------|----------------|----------------|--------------|
| DW-STD | 12.5          | 1.2          | 1.9         | 0.4            | 0.1            | 0.3          |
| DW-1   | 121.3         | 305.8        | 77.6        | 380.5          | 154.6          | 12.9         |
| DW-2   | 734.4         | 298.5        | 592.7       | 371.6          | 194.7          | 17.4         |
| DW-3   | 689.2         | 304.1        | 552.0       | 379.2          | 194.2          | 26.7         |
| DW-4   | 686.2         | 303.1        | 542.5       | 373.9          | 197.4          | 16.7         |
| SW-STD | 583.6         | 23.9         | 460.5       | 10.1           | 45.3           | 12.8         |
| SW-1   | 685.6         | 300.4        | 538.2       | 375.0          | 195.9          | 17.1         |
| SW-2   | 689.5         | 302.2        | 552.6       | 375.8          | 193.4          | 18.7         |
| SW-3   | 684.3         | 305.1        | 540.3       | 377.5          | 198.4          | 16.8         |
| SW-4   | 680.3         | 302.7        | 535.2       | 373.4          | 197.9          | 18.6         |

TABLE 7

Standard deviation of the sample measurements

| Sample | Chloride (mM) | Sulfate (mM) | Sodium (mM) | Potassium (mM) | Magnesium (mM) | Calcium (mM) |
|--------|---------------|--------------|-------------|----------------|----------------|--------------|
| DW-1   | 12.0          | 3.8          | 15.2        | 7.7            | 2.9            | 2.4          |
| DW-2   | 16.8          | 4.7          | 14.1        | 6.0            | 2.7            | 1.1          |
| DW-3   | 16.4          | 1.7          | 14.4        | 0.9            | 1.5            | 1.8          |
| DW-4   | 7.7           | 2.6          | 48.2        | 6.9            | 1.8            | 1.2          |
| SW-1   | 10.6          | 6.2          | 6.2         | 10.7           | 3.5            | 1.6          |
| SW-2   | 9.8           | 2.8          | 23.2        | 7.9            | 8.1            | 17.2         |
| SW-3   | 9.8           | 2.1          | 7.5         | 4.0            | 1.1            | 1.4          |
| SW-4   | 12.3          | 5.5          | 9.7         | 6.3            | 4.7            | 4.2          |

As the undissolved residue counted for more than 50% of the added sample in the 100 g/L solutions, tests with lower concentrations were initiated. To minimize residue and maximize salt dissolution 5 g solid was added to 1 L of water, concentration was then 5 g/L. The solutions were left stirring for 48 hours, and at the end of the mixing period the color of the solution was not transparent, see FIG. 3. Thus, prior to the analyses, the samples were filtered through a 0.22 μm filter, then centrifuged in a high-speed centrifuge before being filtered once more through another 0.22 μm filter, and then finally being diluted before determining ion composition using ion chromatography.

Figure 3:
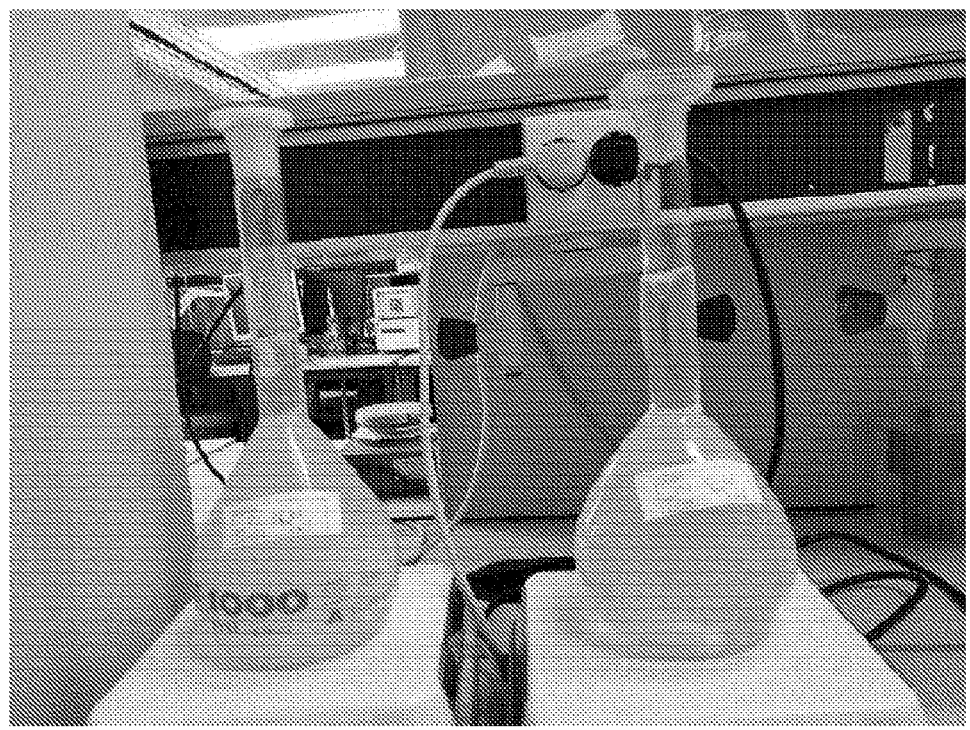
FIG. 3 is a photo of Polyhalite solutions, in distilled water and seawater, in accordance with some demonstrative embodiments.

FIG. 3. is a photo of the solutions after mixing for 48 hours, (left) 5 g/L of Polyhalite in DW and, (right) 5 g/L of Polyhalite in SW.

The final ion concentrations in the water phase are shown below in Table 8. The average concentrations of DW-100 g/L and SW-100 g/L from the analyses results presented in Table 6 are also included.

TABLE 8

Summary of ion concentrations for the dissolution
tests at 25° in DW and SW at 100 g/L and 5 g/L.

| Sample     | Chloride (mM) | Sulfate (mM) | Sodium (mM) | Potassium (mM) | Magnesium (mM) | Calcium (mM) |
|------------|---------------|--------------|-------------|----------------|----------------|--------------|
| DW-STD     | 12.5          | 1.2          | 1.9         | 0.4            | 0.1            | 0.3          |
| DW-100 g/L | 122.0         | 309.9        | 93.3        | 386.0          | 155.9          | 14.3         |
| DW-5 g/L   | 14.6          | 29.3         | 11.7        | 14.1           | 4.5            | 12.7         |
| SW-STD     | 583.6         | 23.9         | 460.5       | 10.1           | 45.3           | 12.8         |
| SW-100 g/L | 684.9         | 302.6        | 541.6       | 375.4          | 196.4          | 17.8         |
| SW-5 g/L   | 580.8         | 54.7         | 460.3       | 26.9           | 53.6           | 33.3         |

The concentration values of the DW-5 g/L and SW-5 g/L are averages of 4 sample measurements, and the standard deviation is presented in Table 9.

TABLE 9

Standard deviations of the sample measurements at concentration of 5 g/L

| Samples | Chloride (mM) | Sulfate (mM) | Sodium (mM) | Potassium (mM) | Magnesium (mM) | Calcium (mM) |
|---|---|---|---|---|---|---|
| DW | 3.0 | 0.1 | 3.1 | 1.4 | 0.1 | 0.7 |
| SW | 3.0 | 5.0 | 3.3 | 0.7 | 1.1 | 6.7 |

The undissolved residue from the 5 g/L solutions was 4.1% of the 5 grams of solid material added to the DW solutions, and 1.8% of the solid material added to SW.

Residue Analyses

The material retained in the 0.22 μm filter from both the distilled water solution and seawater solution were analyzed with SEM photos and EDAX chemical composition. The SEM photos are presented in FIG. 4.

Figure 4:
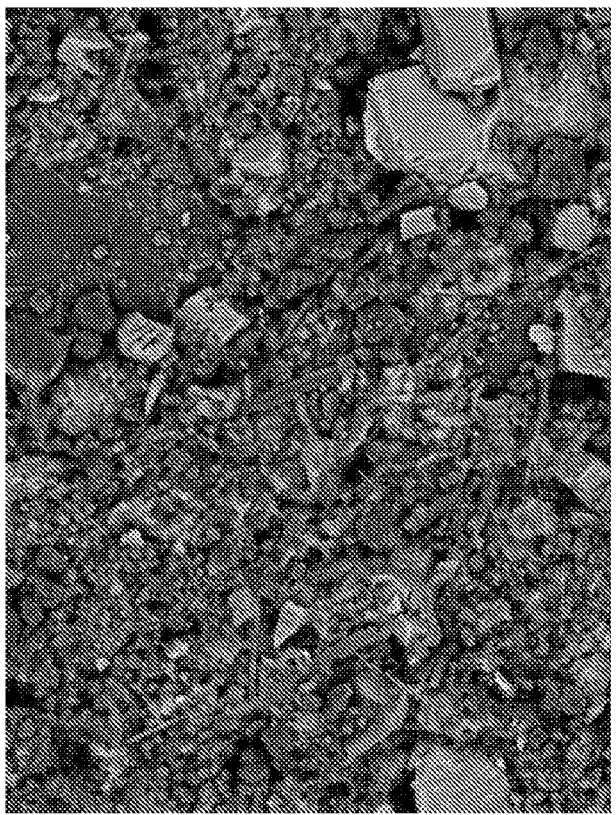
FIG. 4 depicts SEM images of residues at 1000×, (a) Distilled Water (DW) residue, (b) Seawater (SW) residue, in accordance with some embodiments.
Figure 4:
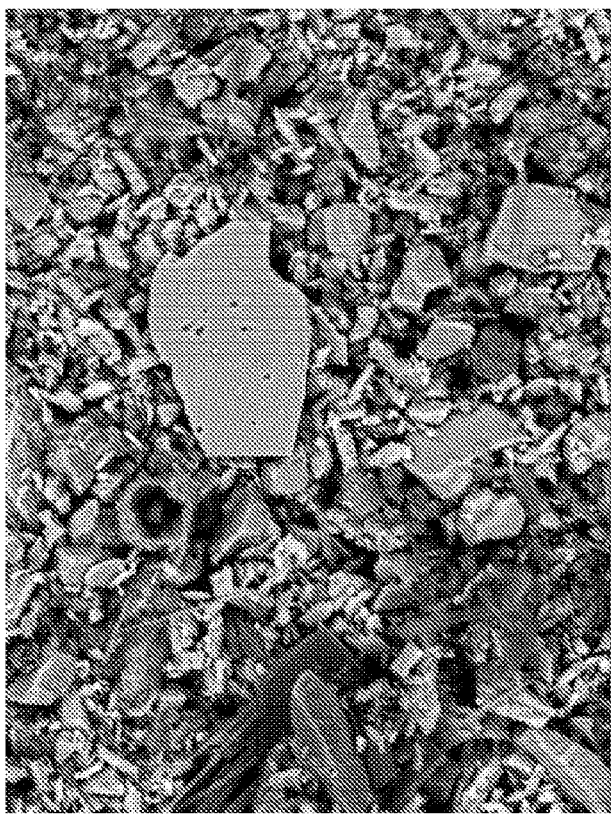

FIG. 4 depicts SEM images of the residues at 1000×, (a) Distilled Water (DW) residue, (b) Seawater (SW) residue.

The particle size in the DW residue varied from 1 to 70 μm, however a particle size close to 10 μm was dominating. Elongated structures of approximately 40 μm were observed in the sample. The EDAX indicated that the residue was mainly composed of calcium sulfate, with silica content of only 5.1 atomic %. The chemical composition of the residue is presented in Table 10.

TABLE 10

Cation and anion elementary analyses for DW residue.

| Cations | | Anions | |
|---|---|---|---|
| Element | Atomic | Element | Atomic |
| Sodium | 0.1 | Sulfur | 95.1 |
| Magnesiu | 14.0 | Chloride | 4.9 |
| Aluminium | 1.6 | | |
| Silica | 5.1 | | |
| Potassium | 2.7 | | |
| Calcium | 76.5 | | |

The residue from the SW sample apparently contained more particles of estimated size 5 μm, thus having smaller particles than the previous DW residue sample. The elongated structures of approximately 40 μm were again observed.

The EDAX indicated that the residue was dominated by calcium sulfate, but the concentration was significantly lower than the values observed with DW.

Additionally, there was a higher content of magnesium and chloride making this sample significantly different from the previous sample. The chemical composition is presented in below Table 11.

TABLE 11

Cation and anion elementary analyses for SW residue.

| Cations | | Anions | |
|---|---|---|---|
| Element | Atomic | Elemen | Atomic |
| Sodium | 1.9 | Sulfur | 64.6 |
| Magnesiu | 25.7 | Chlorid | 35.4 |
| Aluminiu | 0.2 | | |
| Silica | 22.4 | | |
| Potassim | 3.2 | | |
| Calcium | 46.6 | | |

The results showed higher dissolution of Polyhalite minerals in SW in comparison to DW. Total salinity of the solution is higher in the SW-Polyhalite solution than in the DW-Polyhalite solution.

Thus, the EOR-effects for each solution must be experimentally tested to properly quantify their respective wettability potential. This can be investigated in a Phase 2 project, including crude oil and fluid recovery techniques like spontaneous imbibition and forced displacement (waterflooding).

Temperature Scan

For the dissolution tests at different temperatures, solutions of DW and SW with a concentration of 5 g/L were used. After thermal equilibration for 24 hours the samples were centrifuged, filtered through a 0.22 μm filter and diluted prior to ion chromatography analyses.

After increasing the temperature to 130° C. all samples turned white, perhaps due to $CaSO_4$ precipitation, since its solubility decrease with increasing temperature. The resulting solution ion concentrations from the temperature scan are presented below in Table 12 for DW-solutions and in Table 13 for SW-solutions.

TABLE 12

Average concentration of 4 sample measurements at 5 g/L in DW.

| Sample | Chloride (mM) | Sulfate (mM) | Sodium (mM) | Potassium (mM) | Magnesium (mM) | Calcium (mM) |
|---|---|---|---|---|---|---|
| DW-5 g/L-25° C. | 14.6 | 29.3 | 11.7 | 14.1 | 4.5 | 12.7 |
| DW-5 g/L-70° C. | 19.4 | 31.3 | 15.1 | 16.0 | 5.8 | 17.0 |
| DW-5 g/L-90° C. | 8.4 | 24.8 | 8.6 | 13.5 | 5.4 | 6.5 |
| DW-5 g/L-110° C. | 11.7 | 24.8 | 8.7 | 12.5 | 5.1 | 9.4 |
| DW-5 g/L-130° C. | 10.6 | 25.3 | 9.0 | 12.4 | 4.7 | 9.4 |

TABLE 13

Average concentration of 4 samples at 5 g/L in SW.

| Sample | Chloride (mM) | Sulfate (mM) | Sodium (mM) | Potassium (mM) | Magnesium (mM) | Calcium (mM) |
|---|---|---|---|---|---|---|
| SW-5 g/L- 25° C. | 580.8 | 54.7 | 460.3 | 26.9 | 53.6 | 33.3 |
| SW-5 g/L- 70° C. | 584.1 | 53.5 | 459.5 | 26.7 | 54.2 | 28.8 |
| SW-5 g/L- 90° C. | 440.8 | 51.0 | 453.7 | 26.2 | 53.8 | 18.5 |
| SW-5 g/L- 110° C. | 581.4 | 49.2 | 468.8 | 29.1 | 53.7 | 20.3 |
| SW-5 g/L- 130° C. | 598.3 | 45.9 | 469.1 | 28.7 | 51.1 | 28.0 |

The results showed a relatively small effect of temperature on the ion concentrations in DW and SW. The solutions obtained contain the Smart Water ions; calcium and sulfate in sufficient concentrations, and magnesium, which is beneficial for the solution stability. Dissolution of NaCl from the minerals is low, which is positive for the total salinity of the solution. The solutions are potential Smart Water brines, and the Polyhalite minerals prove to be a promising additive.

Surface Reactivity Tests

The chromatographic wettability test was developed for evaluating the wettability of and the reactivity of potential determining ions such as sulfate, calcium and magnesium with the carbonate surface. The test is performed using a core flooding set up. The main principle behind it is the chromatographic separation of ions with different affinities for the water-wet regions of the chalk surface. The component with no affinity is a tracer, in this project lithium is used as tracer, and the adsorbing ion onto water-wet sites is sulfate. A chromatographic analysis of the effluent will determine the tracer and sulfate concentrations. The amount of water-wet area will be determined by the delay in sulfate elution compared to the elution of the tracer.

Surface reactivity was tested for the DW solution with 5 g/l Polyhalite, and this solution was spiked with lithium as a tracer. A brine that did not contain neither sulfate nor tracer was first injected to condition the core, before the DW-Polyhalite was injected. The chromatographic separation of tracer and sulfate for the tests performed at 25° C. and 90° C. are presented in FIGS. 5a-5b.

Figure 5A:
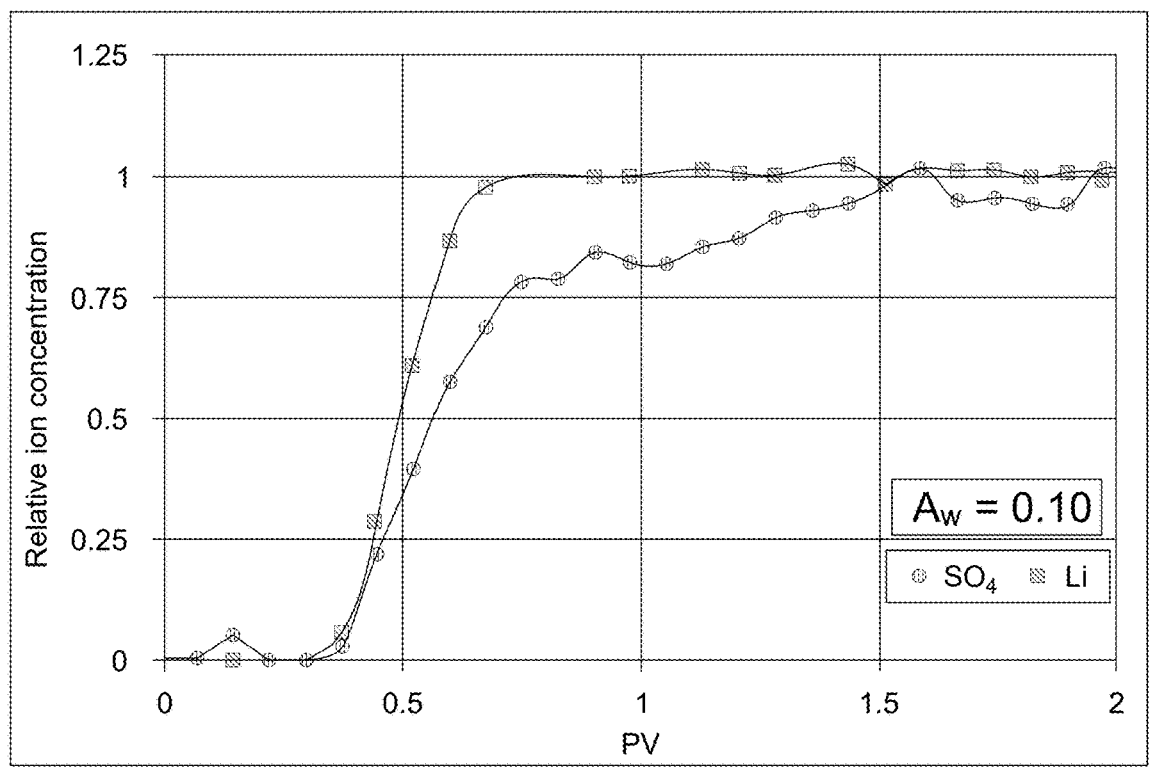
FIGS. 5a and 5b depict graphs showing chromatographic separation between sulfate and lithium on a Stevns Klint outcrop chalk core (a) performed at 25° C.
Figure 5B:
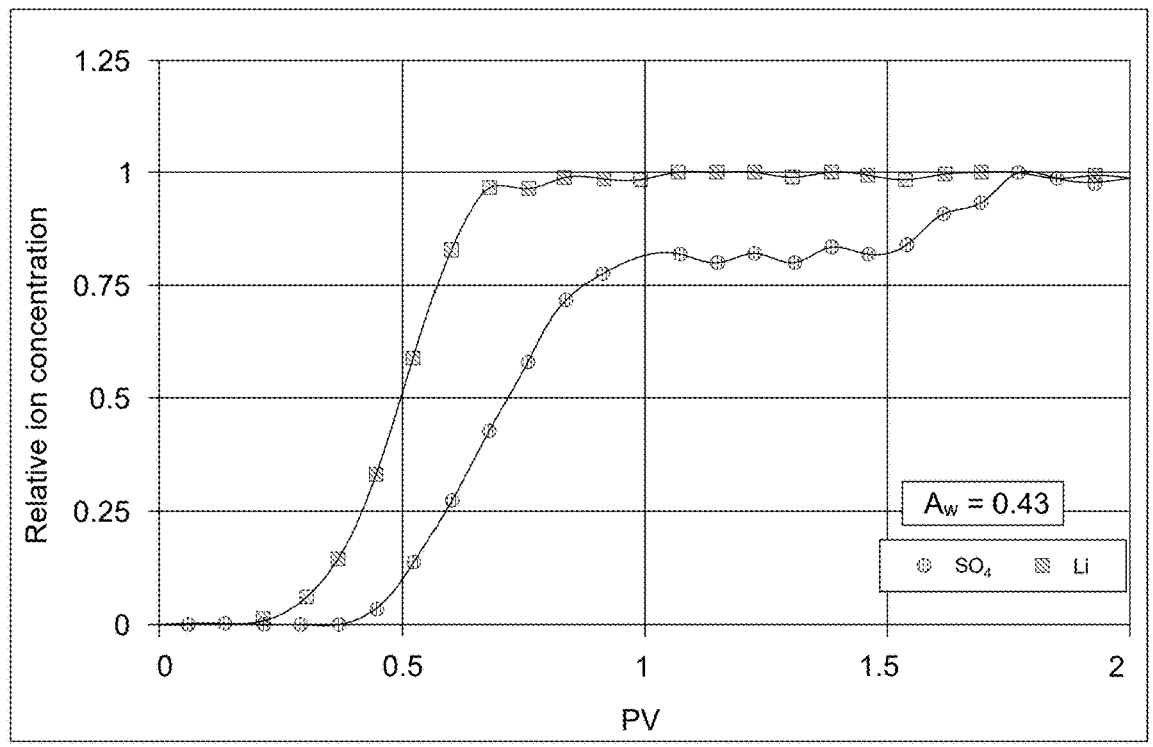

FIGS. 5a-5b depict graphs showing chromatographic separation between sulfate and lithium on a Stevns Klint outcrop chalk core (a) performed at 25° C. (FIG. 5a), and (b) performed at 90° C. (FIG. 5b).

The results observed at 25° C. indicated that the brine termed DW-5 g/L containing Polyhalite was reactive toward the carbonate surface. The separation between the tracer and sulfate curves was quantified by the trapezoidal method being 0.10, indicating that sulfate adsorbed on the surface and that rock-brine interactions were positive for wettability alteration potential in chalk.

The results observed at 90° C. with the brine termed DW-5 g/L containing Polyhalite showed an increased reactivity where the sulfate was substantially delayed. The chromatographic separation area increased, and it was quantified to 0.43. The increase at higher temperature is because of increased reactivity of the sulfate ion at high temperatures due to dehydration and breaking of hydrogen bond structures surrounding the ion in solution.

The results from this Polyhalite feasibility study for EOR-purposes are promising. The Phase 1 experiment has validated the feasibility of the Polyhalite minerals as an additive to prepare Smart Water brines that can be used in carbonate oil fields for production enhancement.

Polyhalite solubility in distilled water (DW) and seawater (SW) was good and the final solution concentrations of sulfate, calcium and magnesium were suitable for the preparation of Smart Water brines. However, further improvement of experimental procedures is needed if the residue, which was 4% in DW and 2% in SW when adding 5 g solids to 1 L of water, should be further reduced and minimized.

The Polyhalite solution showed reactivity toward the chalk in surface reactivity tests at 25° C. and 90° C. Chromatographic separation between sulfate and tracer was confirmed at both temperatures, which shows high potential for inducing wettability alteration in carbonate oil reservoirs.

To confirm and quantify EOR-potential in chalk/carbonate oil recovery tests with crude oil must be performed, including spontaneous imbibition and coreflooding tests and chromatographic wettability tests at various reservoir temperatures. The divalent anion sulfate $SO_4^{2-}$ present in polyhalite smart water competes with carboxylic acid of crude oil, which is attached to the rock surface. This behavior of ions leads to detachment of acid groups from the carbonate surface, thus changing the rock wettability. Also adding divalent cations such as calcium $Ca^{2+}$ and magnesium $Mg^{2+}$ along with $SO_4^{2-}$ at elevated temperature induces wettability alteration to improve the oil recovery.

Example 2

Seawater injection is an EOR success in the North Sea carbonate reservoirs due to wettability alteration toward a more water-wet state, this process is triggered by the difference in composition between injection and formation water. "Smart Water" with optimized ionic composition can be easily made under laboratory conditions to improve oil recovery beyond that of seawater, however, in the field, its preparation may require specific water treatment processes, e.g., desalination, nano-filtration or addition of specific salts. In order to overcome these challenges, Polyhalite (also referred to herein as "Polysulphate" or "(PS)") may be used as an additive in a solution for the recovery of oil, i.e., to produce Smart Water.

According to some embodiments, in this experiment, Outcrop chalk from Stevns Klint, consisting of 98% biogenic $CaCO_3$, was used to investigate the potential and efficiency of the Polyhalite brines to alter wettability in chalk. Solubility of Polyhalite in seawater and de-ionized water and brine stability at high temperatures were measured. Energy Dispersive X-Ray and ion chromatography were used to determine the composition of the Polyhalite salt and EOR-solutions, and to evaluate the sulphate adsorption on the chalk surface, a catalyst for the wettability alteration process. Spontaneous imbibition, for evaluating wettability alteration, of Polyhalite brines into mixed-wet chalk was performed at 90 and 110° C. and compared against the recovery performance of formation water and seawater.

The solubility tests showed that the salt was easily soluble in both de-ionized water and seawater with less than 5% solid residue. The de-ionized Polyhalite brine contained sulphate and calcium ion concentration of 31.5 millimolar (mM) and 15.2 mM, respectively, and total salinity was 4.9 g/L. This brine composition is very promising for triggering wettability alteration in chalk. The seawater Polyhalite brine contained 29.6 mM calcium ions and 55.9 mM sulphate ions, and a total salinity of 38.1 g/L. Compared to ordinary seawater this brine has the potential for improved wettability alteration in chalk due to increased sulphate content.

Ion chromatography revealed that the sulphate adsorbed when Polyhalite brines were flooded through the core, which is an indication that wettability alteration can take place during brine injection, the reactivity was also enhanced by increasing the temperature from 25 to 90° C. Finally, the oil recovery tests by spontaneous imbibition showed that Polyhalite brines were capable of inducing wettability alteration, improving oil recovery beyond that obtained by formation water injection. The difference in oil recovery between ordinary seawater and seawater Polyhalite injection was smaller due to the already favorable composition of seawater.

Polyhalite brines showed a significant potential for wettability alteration in carbonates and are validated as a potential EOR additives for easy and on-site preparation of Smart Water brines for carbonate oil reservoirs. Polyhalite salt, added to the EOR-solution, provides the essential ions for the wettability alteration process, but further optimization is needed to characterize the optimal mixing ratios, ion compositions, and temperature ranges at which EOR effects can be achieved.

Carbonate reservoirs account for approximately 50% of the world's hydrocarbon reserves, with more than 60% of the oil and 40% of the gas reserves. Despite holding large reserves, the oil recovered from these reservoirs is usually lower than 30% of OOIP, thereby, making the enhanced oil recovery (EOR) potential from carbonates very attractive and high.

Carbonate reservoirs are known for being a challenging environment for oil production. The difficulties met by reservoir and production engineers are low matrix permeabilities combined with natural fractures, and unfavorable wettability as their wettability usually falls within the neutral to oil-wet range, which limits capillary forces and reduce the potential for water imbibition into the rock matrixes during water injection. All these conditions can lead to water fingering, early water breakthrough and low oil recovery rates.

Wettability in carbonates is highly influenced by the presence of polar organic components (POC) in crude oil, where the acidic components are more important than the basic components. The POC components are quantified with the acid number (AN) and base number (BN). A reduction in water-wetness was observed when initially, very water-wet carbonate cores were exposed to crude oils with increasing acid number (AN). The impact of AN on carbonates wettability effect has been confirmed by other researchers. It is also important to note that the brine pH in carbonates is buffered to slightly alkaline conditions. Therefore, the species driving the wettability of the rock surfaces are dissociated carboxilyc acids and non-protonated bases.

The initial wetting of a carbonate reservoir is established when negatively charged carboxylates adsorb onto positively charged carbonate pore surfaces.

This will happen during the oil migration into the reservoir. Reservoir temperature can affect the crude oil chemical composition due to decarboxylation processes that take place at high temperatures. These processes decrease the AN of the crude oil. Therefore, a higher water-wetness observed in a carbonate reservoir, can be correlated to crude oils with low AN or high temperature reservoirs.

A water based EOR method that can contribute with a wettability alteration towards more water-wet state is very important in heterogenous reservoirs. Increased capillary forces will promote spontaneous imbibition of brine from fractures into the matrix and mobilize trapped oil. Delayed water breakthrough by taking benefit of reservoir heterogeneity is highly valuable in the pursuit for increased oil production from carbonate reservoirs. According to some embodiments, smart Water is a method that meets all these requirements, and it is only prepared by changing the ionic composition of the injection water.

A well-known smart water EOR effect has been observed in natural fractured chalk fields in the North Sea by injecting seawater. The wettability alteration is induced by the specific ions present in seawater, calcium ($Ca^{2+}$), magnesium ($Mg^{2+}$), and sulphate ($SO_4^{2-}$). The wettability alteration is induced by the specific ions present in seawater, calcium, magnesium, and sulphate. The catalyst for this process was identified to be the sulphate present in SW, and calcium appeared to be also an important ion that is able to co-adsorb on the chalk surface to facilitate the process of wettability alteration. Magnesium ions seemed to be relevant at high temperatures, where it can be exchanged with calcium ions from the chalk surface, making more calcium ions available in the bulk fluid to subsequently impacting positively on the EOR effect. The effect of increased sulphate and calcium concentration on the imbibing brine can be observed in FIGS. 6 a-b.

Further modification of SW composition can boost the oil recovery factor in carbonates. For instance, reduced concentration of NaCl from SW, or increased concentration of the catalyst (sulphate) in the brine, may be ways to increase oil recovery beyond the wettability alteration potential of SW FIG. 7.

The wettability alteration process in carbonates is also temperature dependent, it appears that the effect for improved oil recovery is enhanced at higher temperatures. The reason behind this effect is connected to the increased reactivity of ions towards carbonate surfaces.

As the temperature increases the ions present in water reduce their hydration number; this change is translated into less water molecules surrounding them, allowing more interaction in between ions and increasing their chemical reactivity. The temperature effects could impact both the established initial wetting and the wettability alteration processes.

In the Smart Water EOR mechanism for carbonates the adsorption of $SO_4^{2-}$ ions towards the rock surface will reduce the positive surface charge facilitating a co-adsorption of $Ca^{2+}$, which are the common ion of $CaCO_3$. Then, a reaction between $Ca^{2+}$ and the adsorbed acidic components on the surface, which are largely represented by dissociated carboxylic acids (RCOO—). Then, a reaction between $Ca^{2+}$ and the adsorbed acidic components on the surface, which are largely represented by dissociated carboxylic acids (RCOO—) will trigger the desorption of the organic molecule changing the wettability as illustrated in FIG. 8.

Figure 8:
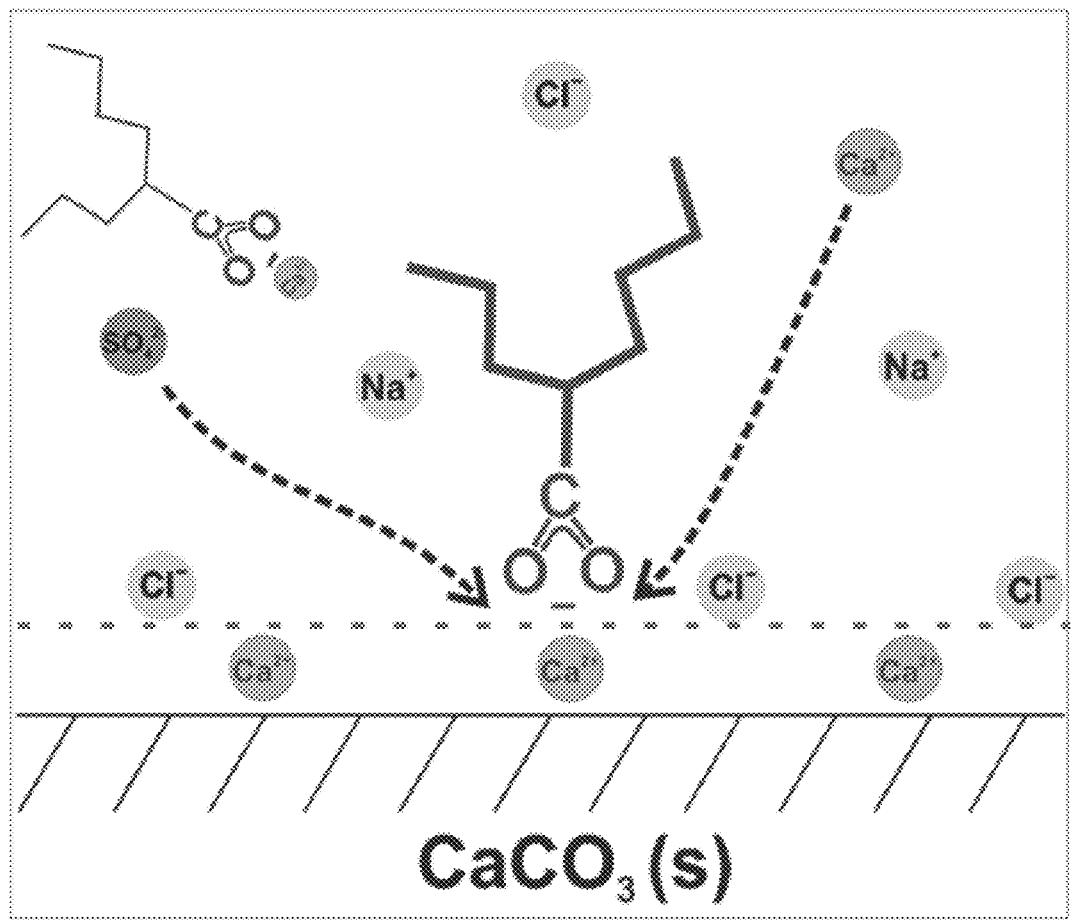
FIG. 8 is a schematic illustration of Smart Water mechanism in carbonates. The active ions are $SO_4^{2-}$ and $Ca^{2+}$. At high temperature $Mg^{2+}$ becomes more reactive influencing the $Ca^{2+}$ concentration in solution.

According to some embodiments, FIG. 8 is a schematic illustration of Smart Water mechanism in carbonates. The active ions are $SO_4^{2-}$ and $Ca^{2+}$. At high temperature $Mg^{2+}$ becomes more reactive influencing the $Ca^{2+}$ concentration in solution.

According to some embodiments, the temperature might also influence this process. $Mg^{2+}$ ions at high temperature also become more reactive due to dehydration. Experiments have confirmed that $Mg^{2+}$ can interact with the calcite surfaces and release more $Ca^{2+}$ ions into the surrounding environment speeding up the process of wettability alteration. At high temperatures the $Mg^{2+}$ ions will also complex with $SO_4^{2-}$ ions reducing $CaSO_4$ precipitation which will lower the concentration of $Ca^{2+}$ and $SO_4^{2-}$ which is needed in the wettability alteration process.

In a comparative study performed, several SI tests at varying $SO_4^{2-}$, $Ca^{2+}$, and $Mg^{2+}$ concentrations were evaluated at increasing temperatures starting at 70° C. with gradual increments to 100 and 130° C. It was found that the role of calcium is highly relevant, but it requires presence of sulphate, FIG. 9.

Figure 9:
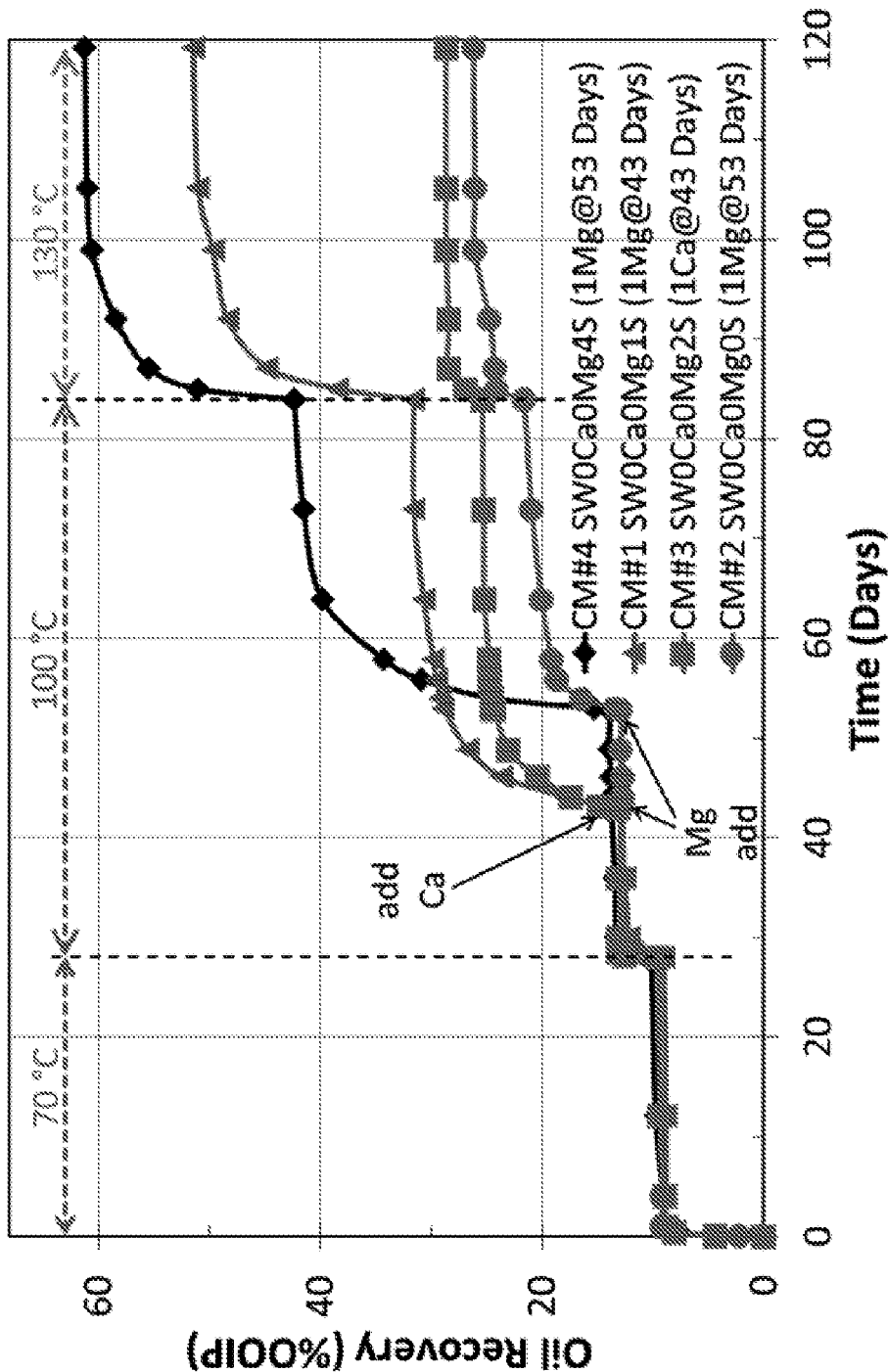
FIG. 9 is a graph depicting the spontaneous imbibition on chalk cores with SW at changing $SO_4^{2-}$, $Ca^{2+}$ and $Mg^{2+}$ concentrations and temperatures FIG. 10. is a schematic illustration of a nanofiltration process with seawater (SW) as main feed, according to some demonstrative embodiments.

According to some embodiments, the graph in FIG. 9 shows the spontaneous imbibition on chalk cores with SW at changing $SO_4^{2-}$, $Ca^{2+}$ and $Mg^{2+}$ concentrations and temperatures Preparation of Smart Water for carbonate field applications is a challenge. Efforts have been done to improve seawater by using reverse osmosis (R.O) in combination with nano-filtration. Nevertheless, these methods are highly energy intensive and represent a large investment because they increase capital expenditure (CAPEX) and operation expenditure (OPEX). Thereby, there is a need for production of Smart Water at low cost that can reduce their impact in OPEX and CAPEX during oil production activities.

Figure 10:
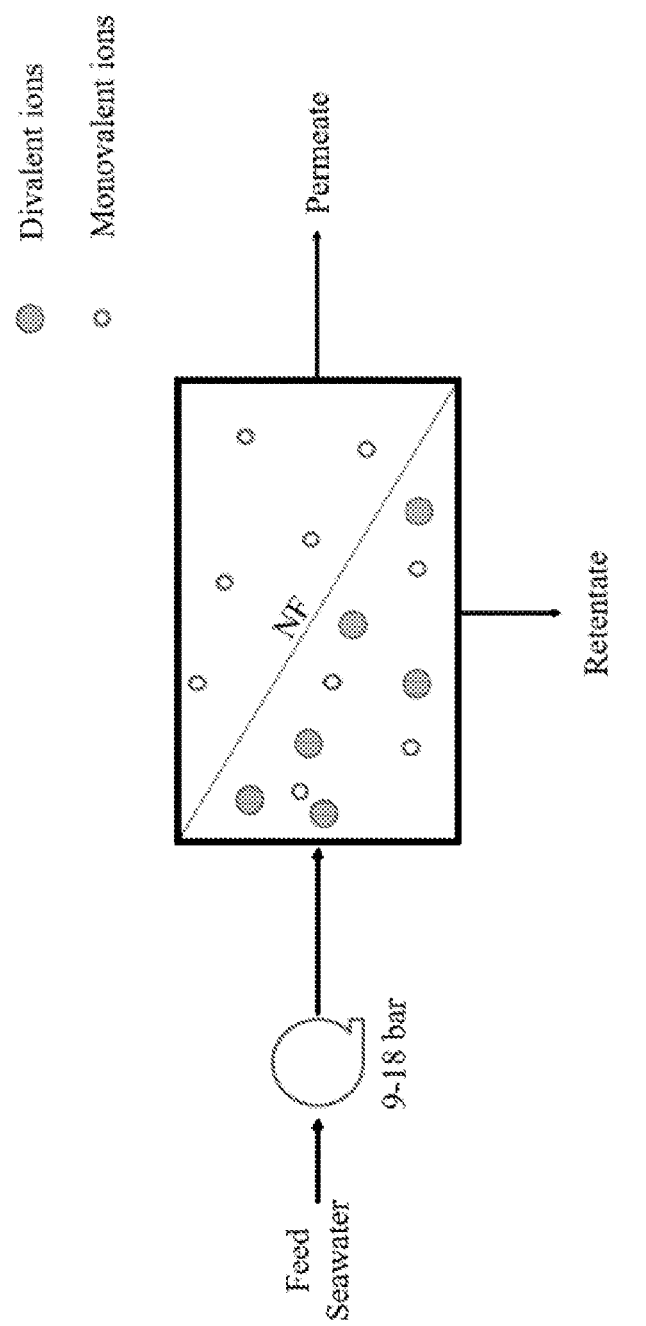

Previous attempts have been made to use nanofiltration of SW to create a retentate rich in divalent ions and a permeate free of divalent ions. By obtaining these two solutions, they could be used as main stock for preparation of new Smart Water brines. The process requires a pressure of 9 to 18 bar that forces the seawater stream to go through the semipermeable membrane as illustrated in FIG. 10, showing a nanofiltration process with seawater (SW) as main feed, according to some demonstrative embodiments.

Figure 11:
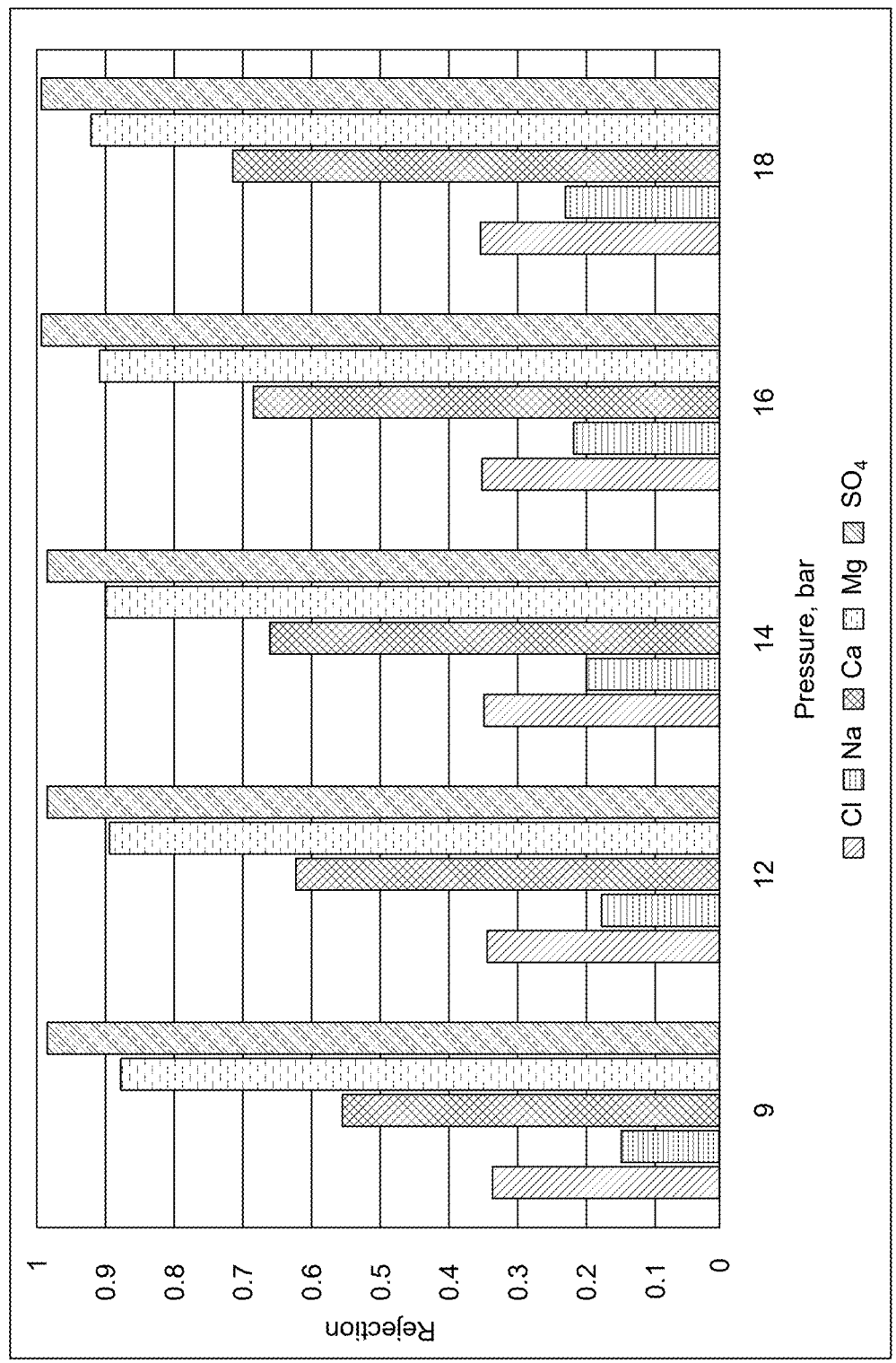
FIG. 11 is a graph depicting the Ion rejection at different pressures using nano-SW membranes, according to some embodiments.

The results show that nanofiltration using seawater as main feed was not effective for producing a Smart Water enriched in divalent ions and with reduced (monovalent ions) salinity. Ion rejection at different pressures were quantified and are displayed in FIG. 11.

The rejection of monovalent $Na^+$ and $Cl^-$ ions was 15-35%. The rejection of calcium increased from 55 to 70% when the pressure increased from 9-18 bar. Even though the concentration of monovalent and divalent ions in the permeate could be changed, typically only 5-20% of the feed is allocated to the permeate, resulting in retentates with ion concentrations close to seawater. According to some embodiments, Polyhalite salts were proven as effective acting as an additive for EOR Smart Water preparation. Dissolution of Polyhalite in water/brines provides the potential determining ions needed for the wettability alteration process in carbonates.

Example 3

Figure 12:
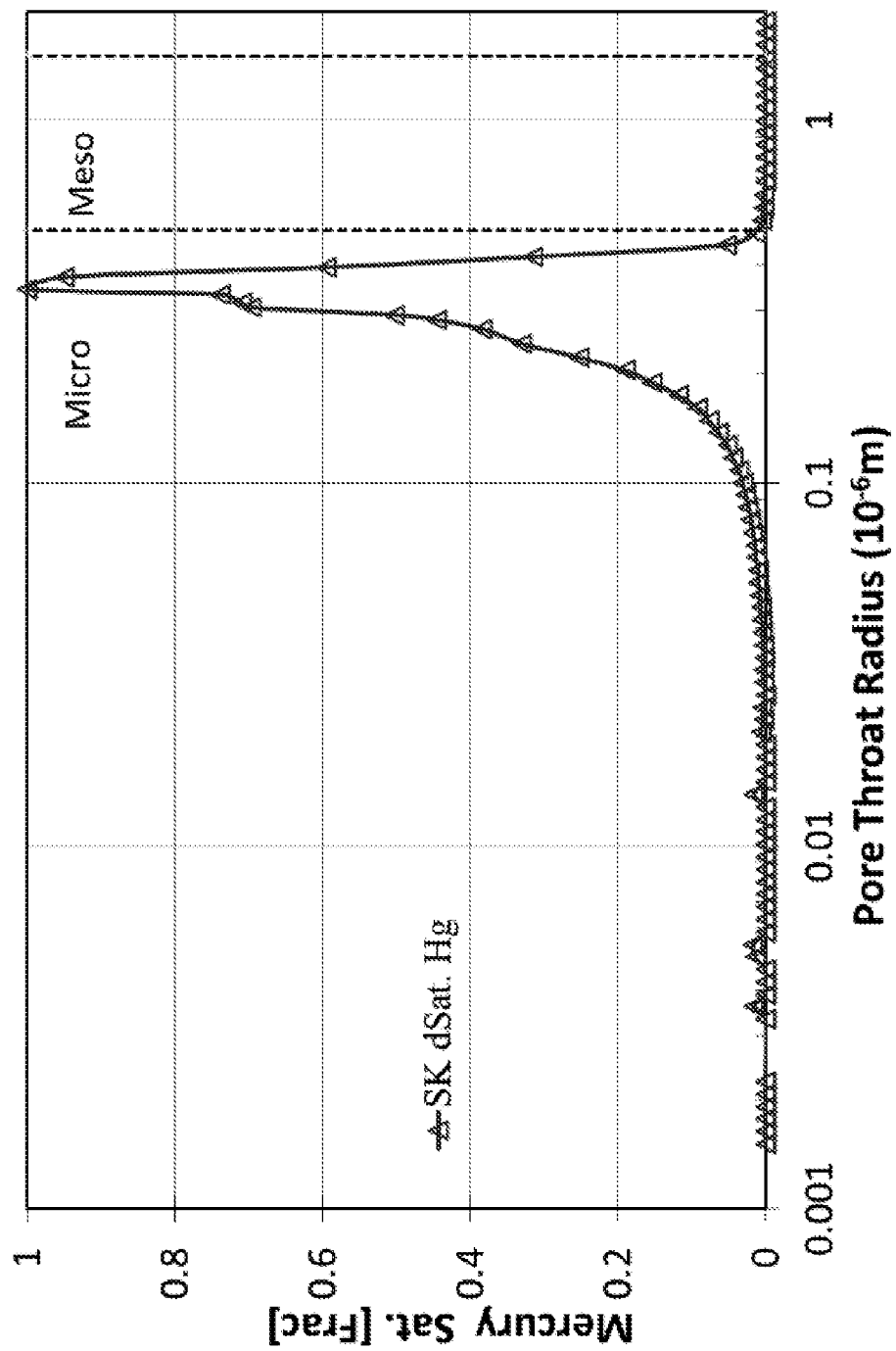
FIG. 12 is a graph depicting the Pore size distribution for (a) SK chalk by MICP, according to some embodiments.

The performance of Polyhalite as an additive may be evaluated based on dissolution tests, chemical reactivity tests, and spontaneous imbibition on restored mixed wet chalk cores.
Experimental Work
Materials
Rock Samples Outcrop Chalk collected from Stevns Klint (SK) quarry, near Copenhagen, Denmark, was used in this experiment, and it is well known to be a good analogue for North Sea chalk oil reservoirs. SK Chalk consists of 98% pure $CaCO_3$ of biogenic origin, being coccoliths and fragments of them the building unit of this material. Characteristic permeabilities are between 1 to 10 md, with relatively high porosities (45-50%). The pore size distribution typically ranges from 0.1 to 1 m as presented in FIG. 12.

Figure 13:
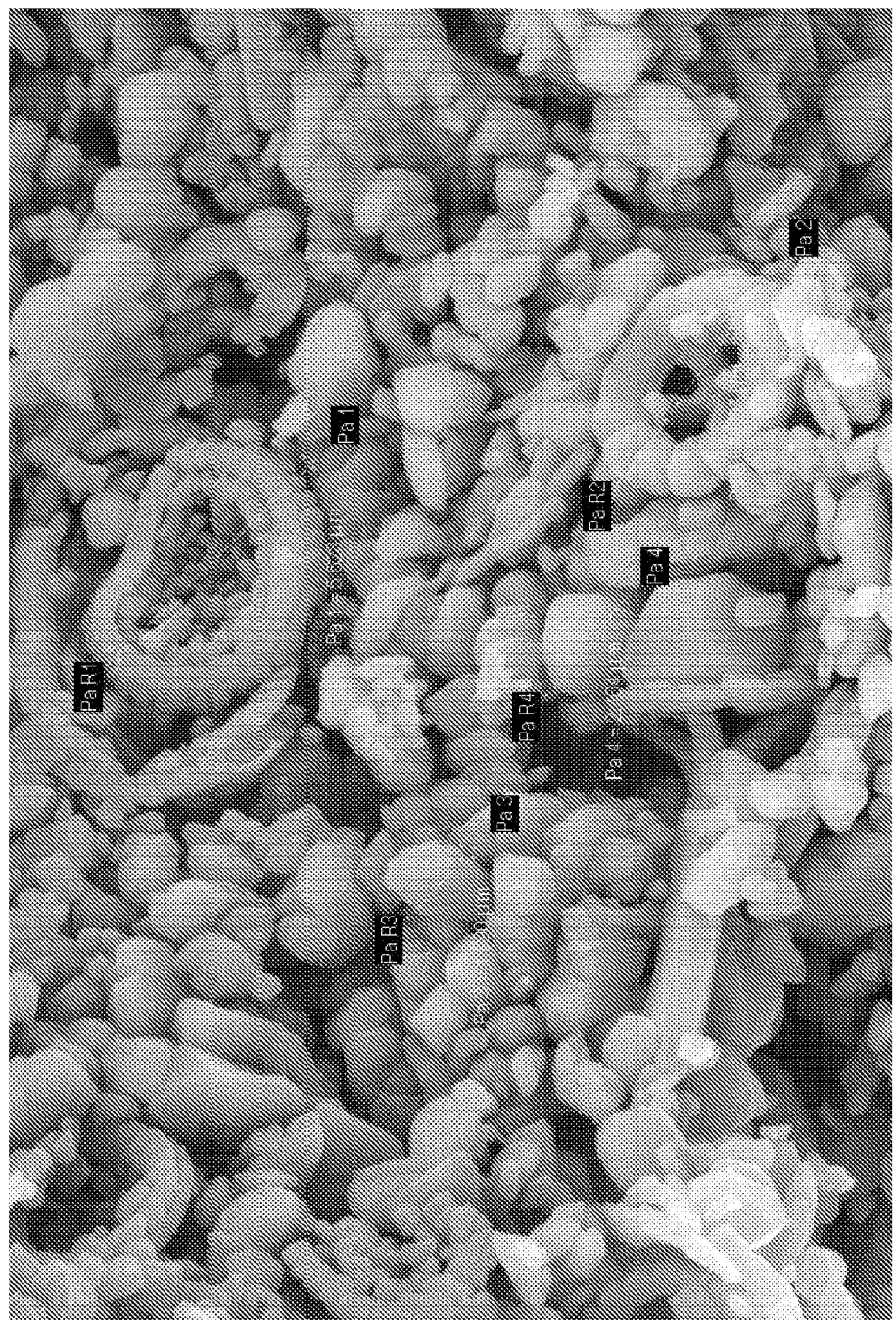
FIG. 13 is a SEM image of uncleaned Stevens Klint outcrop chalk at 10,000× magnification

Under the scanning electron microscope (SEM) it may be possible to see in detail the porous media structure of the material, cocolithic rings and fragments of them are visualized in FIG. 13 (which depicts a SEM image of uncleaned Stevens Klint outcrop chalk at 10 000× magnification). The heterogeneity of the chalk surface is more clearly observed after increasing the magnification in the microscope.

All cores were drilled from the same chalk block in the same direction and cut and shaped to the desired diameter of 3.8 cm and the desired length of 7 cm. All cores were inspected visually, and no visible fractures and distinct heterogeneities were found. The properties of the cores used in this work are given in Table 14.

TABLE 14

| Physical properties of the SK cores. | | | | | | | | | |
|---|---|---|---|---|---|---|---|---|---|
| Core | SK1 | SK2 | SK3 | SK4 | SK5 | SK6 | SK7 | SK8 | SK9 |
| Length (cm) | 7.1 | 7.1 | 7.1 | 7.2 | 7.0 | 6.9 | 7.1 | 7.0 | 7.0 |
| Diameter (cm) | 3.8 | 3.8 | 3.8 | 3.8 | 3.8 | 3.8 | 3.8 | 3.8 | 3.8 |
| PV (ml) | 38.6 | 39.1 | 39.1 | 40.1 | 41.3 | 38.6 | 37.9 | 40.0 | 37.9 |
| Porosity (%) | 48.6 | 48.6 | 48.8 | 49.2 | 49.3 | 49.2 | 47.4 | 50.2 | 47.2 |

TABLE 14-continued

Physical properties of the SK cores.

| Core | SK1 | SK2 | SK3 | SK4 | SK5 | SK6 | SK7 | SK8 | SK9 |
|---|---|---|---|---|---|---|---|---|---|
| Permeability (mD) | 4.1 | 4.7 | 3.8 | 3.8 | 4.1 | 4.7 | 3.8 | 3.8 | 4.0 |
| BET m$^2$/g | | | | | 2.0 | | | | |
| Used in experiment | SIFW @90° C. | SISW @90° C. | SIDW-PS @90° C. | SISW-PS @90° C. | SIFW @110° C. | SISW @110° C. | SIDW-PS@110° C. | SISW-PS@110° C. | CWT @25 & 90° C. |

The physical properties of the cores were similar to previously published data known in the art.

Polyhalite Salt

Figure 14:
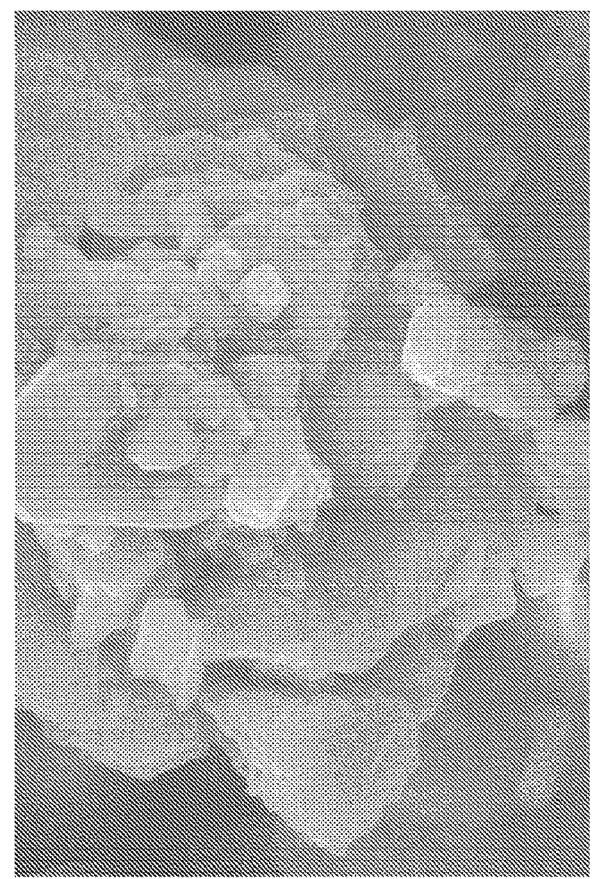
FIG. 14 is a photo of SEM images of a Polyhalite sample at (a) 5000× magnification, (b) 10000× magnification.
Figure 14:
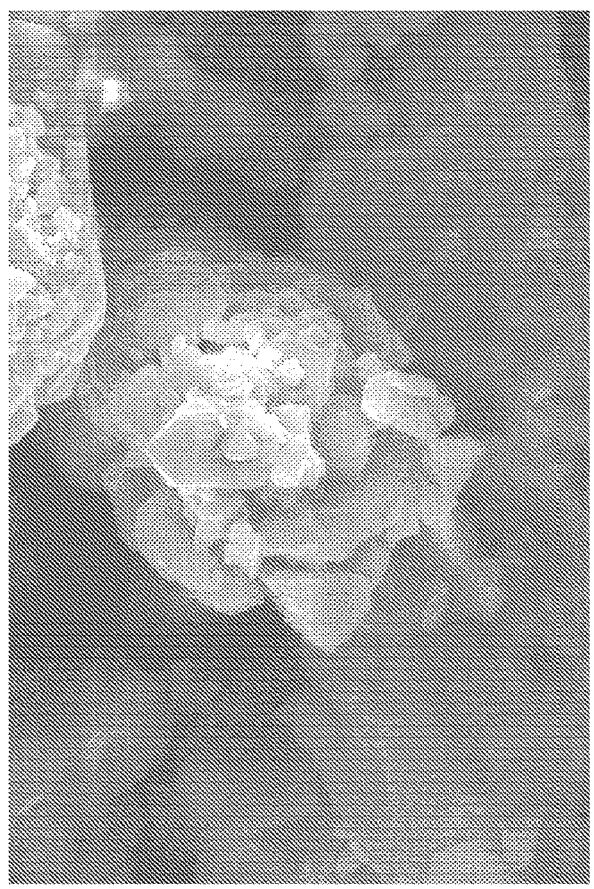

The natural Polyhalite salts provided by ICL, were mined from polyhalite rock layer located 1000 m below the North Sea near North Yorkshire coast in the UK. Scanning Electron Microscope (SEM) was used to take high resolution picture of Polyhalite salt mineral and Energy dispersive X-Ray (EDX) was used to analyze its composition. The SEM images of Polyhalite salts at 5000 (a) and 1000 (b) magnification are given at FIG. 14.

The salt grains had different particle sizes well spread within the samples analyzed. The predominant particle diameter was in the range of from 5 to 30 μm.

Elemental analysis was carried out for both cations and anions for Polyhalite samples. The results are presented below in Table 15. The sample are composition is dominated by calcium, potassium, and magnesium cations. On the anion side, sulphate was the main component detected in the sample.

TABLE 15

Elementary composition by atomic weight % of cations and anions in Polyhalite

| Cations | | Anions | |
|---|---|---|---|
| Element | Atomic weight % | Element | Atomic weight % |
| Sodium | 9.3 | Sulfur | 85.4 |
| Magnesium | 21.9 | Chloride | 14.6 |
| Aluminium | 3.2 | | |
| Silica | 3.3 | | |
| Potassium | 25.5 | | |
| Calcium | 36.9 | | |

Crude Oil

A low asphaltenic dead oil with an acid number (AN) of 2.90 mg KOH/g and a base number (BN) of 0.95 mg KOH/g was used as source. The dead oil was diluted with 40 weight % heptane, centrifuged, and filtrated through a 5 μm Millipore filter. The prepared base crude oil was named RES40 and the AN measured, ~2.1 mg KOH/g. No asphaltenic precipitation was observed during filtration or in the storage phase.

A batch of the RES40 oil were treated with silica gel to remove the surface active polar organic components (POC) providing an Oil with AN=0.0 mg KOH/g, named RES40-0 oil Then, the diluted oil RES40 and silica-treated oil RES40-0 were mixed in specific proportions to obtain the crude oil (Oil A) used in these experiments, having an AN=0.58 mg KOH/g and a BN=0.30 mg KOH/g. The properties of the oils are reported in Table 16.

TABLE 16

Oil properties

| Oil | AN (mgKOH/g) | BN (mgKOH/g) | $\rho_{20°\,C.}$ (g/cm$^3$) | $\mu_{23°\,C.}$ mPa·s |
|---|---|---|---|---|
| RES40 | 2.18 | 0.66 | 0.81 | 2.4 |
| RES40-0 | 0.0 | 0.05 | 0.81 | 2.1 |
| Oil A | 0.58 | 0.30 | 0.81 | 2.4 |

The AN and BN of the oil samples were analyzed by potentiometric titration following the procedure and the density and viscosity of the prepared Oil A were determined to be 0.81 g/cm$^3$ and 2.4 cP.

Brines

Seawater (SW) and formation water (FW) brines used in this experiment were made by mixing distilled water (DW) with reagent-grade salts. SW composition is based on the seawater composition from the North Sea. The FW composition is based on the formation water from a North Sea Chalk reservoir. SW and FW brines were mixed overnight by magnetic rotation and filtered through a 0.22 μm Millipore filter. The properties of SW and FW brines are given in Table 17. DW0T and DW1T brines were used for the chromatographic wettability tests, the brines were adapted to use the Polyhalite salt as one of the ions source, the other source to adjust the composition were reagent grade salts. The brine compositions are listed in Table 17.

Dissolution of Polyhalite

The Polyhalite brines DW-PS and SW-PS were made by mixing distilled water (DW) and seawater (SW) with 5.00 g Polyhalite (PS) per liter solution. The solutions were mixed for 6 days with a magnetic stirrer before filtration through a 0.22 m Millipore filter. Very similar amounts of Polyhalite salt were dissolved independently of aqueous solution used, i.e., seawater or distilled water. Thus, the capacity of the salt to be dissolved under different brines is high, more than 95% of the salts added were dissolved in the mixing processes, Table 17.

TABLE 17

Properties of brines.

| Ion (mM)/ Properties | SW | FW | DW-PS | SW-PS | DW0T | DW1T |
|---|---|---|---|---|---|---|
| [Na$^+$] | 450.1 | 997.0 | 6.3 | 466.2 | 6.3 | 6.3 |
| [K$^+$] | 10.1 | 5.0 | 17.4 | 28.2 | 17.4 | 17.4 |
| [Li$^+$] | — | — | — | — | — | 24.0 |
| [Ca$^+$] | 13.0 | 29.0 | 15.2 | 29.6 | 15.2 | 15.2 |
| [Mg$^{2+}$] | 44.5 | 8.0 | 5.8 | 47.9 | 5.8 | 5.8 |
| [Cl$^-$] | 525.1 | 1066.0 | 9.2 | 528.5 | 9.2 | 33.2 |
| [HCO$_3^-$] | 2.0 | 9.0 | — | — | 2.0 | 2.0 |
| [SO$_4^{2-}$] | 24.0 | 0.0 | 31.5 | 55.9 | — | 31.5 |
| TDS (g/L) | 33.38 | 62.83 | 4.9 | 38.14 | 6.5 | 6.1 |

TABLE 17-continued

Properties of brines.

| Ion (mM)/Properties | SW | FW | DW-PS | SW-PS | DW0T | DW1T |
|---|---|---|---|---|---|---|
| Density (g/cm$^3$) | 1.02 | 1.04 | 1.0 | 1.02 | 1.0 | 1.0 |
| Bulk-pH | 7.8 | 7.3 | 7.5 | 8.1 | 7.8 | 7.8 |

Surface Reactivity Tests

The surface reactivity of chalk cores with DW-PS was studied at different temperatures (25 and 90° C.) using the chromatographic wettability test developed for evaluating the wettability and the reactivity of potential determining ions such as sulfate, calcium, and magnesium with the carbonate surface. The test is performed using a core flooding set up. First, the core was flooded (5-6 PV) with DW0T, a brine having similar concentration of ions as DW-PS but depleted in sulphate.

Then the core was flooded with DW1T, the DW-PS brine with a small amount of Li$^+$ ions as tracer. The tracer has no affinity towards chalk minerals and follows the displacement front. On the other hand, sulphate has affinity towards water wet minerals and thus comes out later than the tracer. Ion chromatograph (IC) analysis of effluents will determine the tracer and sulphate concentrations. The relative amount of water-wet area or the reactivity of sulphate towards water-wet chalk minerals will be determined by the delay in sulphate elution compared to the elution of the tracer.

Core Restoration

Initial Water Saturation ($S_{wi}$)

All cores were initially cleaned by flooding 5 PV of distilled water (DW) at room temperature to remove easily dissolvable salts, especially sulphate salts. The cores were then dried at 90° C. to a constant weight. The initial formation water saturation ($S_{wi}$) of 10% was established by using the desiccator technique and stored in a sealed container for 3 days to allow an even ion distribution within the cores.

Oil Exposure and Ageing

The cores with $S_{wi}$=10% were vacuum saturated with Oil A before flooding 1.5 PV in each direction at 50° C. Finally, the cores were wrapped in Teflon tape to avoid unrepresentative wetting on the outer surface and aged in the same oil for 2 weeks at 90° C. to achieve a more homogeneous core wetting.

Oil Recovery by Spontaneous Imbibition

Figure 15:
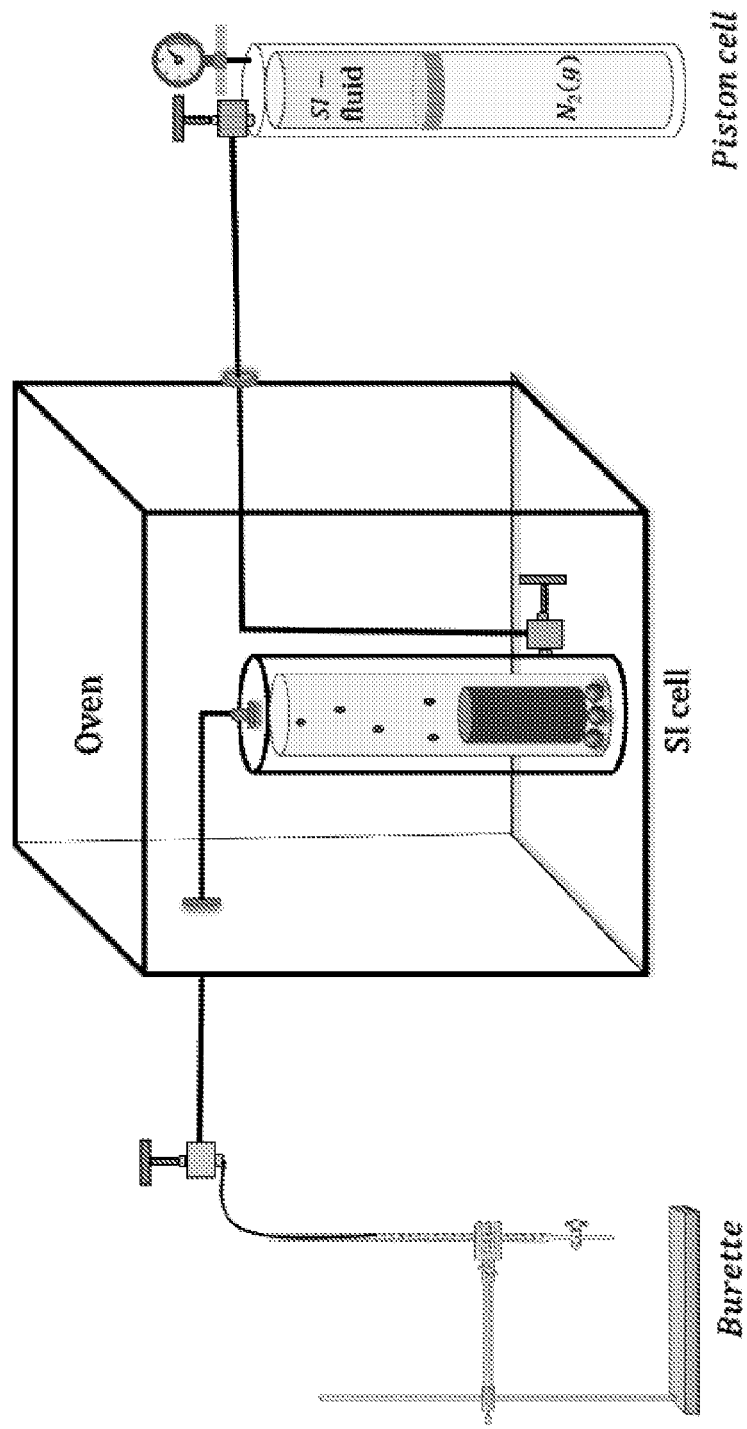
FIG. 15 is a schematic illustration of the setup used for spontaneous imbibition experiment, according to some embodiments.

Spontaneous imbibition (SI) experiment was performed on the restored cores to evaluate the initial core wettability and the performance of different brines as an EOR fluid. The imbibition experiments were performed at 90 and 110° C. at a back pressure of 10 bar using FW, SW, DW-PS and SW-PS as the imbibing brines. The volume of oil produced was calculated as % original oil in place (% OOIP) versus time. The experimental setup is depicted in FIG. 15.

Results and Discussion

Dissolution of Polyhalite Salts in DW and SW.

The solubility of the Polyhalite minerals was tested in distilled Water (DW). Exactly 5.00 grams of the Polyhalite (PS) salt were added to 1 liter of DW or SW. The DW-PS and SW-PS solutions were mixed on a magnetic stirrer for 6 days at 23° C.

The brines were then filtrated through a 0.22 m filter. The ion compositions of the filtrated brines were analyzed by IC. The filters along with insoluble particles from the salts were dried and the quantified by weight. The particles were also analyzed with SEM and EDX. The brine composition of DW-PS and SW-PS after 6 days of mixing are given in Table 17.

Small Changes in ion composition were observed from one batch to another. To avoid variations in the concentrations, stock solutions of 20 liters for both DW-PS and SW-PS were prepared to obtain uniform compositions throughout the experimental work planned.

Polyhalite in Distilled Water (DW-PS)

The ion composition after diluting 5.00 g to 1 liter with DW showed a sulphate concentration of 31.5 mM, slightly higher than the concentration in SW (24 mM). Calcium concentration was 15.2 mM and magnesium 5.8 mM. In comparison to SW the largest difference was observed for the magnesium which is 44.5 mM in SW. The Polyhalite salt also contain significant amount of potassium with a concentration of 14.4 mM. The total salinity of DW-PS was 4885 ppm, with a rather low concentration of sodium (6.3 mM) and chlorides (9.2 mM). The insoluble part of the PS after filtration was 0.115 g, which means that the solid residue represents only 2.3% of the total PS salt added to DW.

Polyhalite in Seawater (SW-PS)

After diluting 5.00 g PS salt to 1 liter with Seawater (SW), the concentration of sulphate in SW-PS was 55.9 mM. This represents an increase of 31.9 mM compared to SW (24.0 mM). Calcium concentration was 29.6 mM, which represent an increase of 16.6 mM compared to SW (13.0 mM). Magnesium concentration was 47.9 mM, confirming an increase of 3.4 mM after PS exposure. Potassium concentration increased from 10.1 mM in SW to 28.2 mM for SW-PS, which represent an increase of 18.1 mM. The total salinity of the SW-PS brine was 38140 ppm which is an increase of 4760 ppm. The solid residue after filtration was only 0.200 g which represent only 4.0% of the PS added to SW.

It appears that in both brines, DW-PS and SW-PS, the concentration of the determining ions calcium, sulphate and magnesium is sufficient to trigger smart water effects. However, the concentration of this ions is larger in the SW-PS solution, due to the previous presence of these ions in seawater.

It was observed that like amounts of Polyhalite salt were dissolved independently of the aqueous solution used, i.e., seawater or distilled water. More than a 95% of the salts were dissolved in the mixing processes. This might be due to the elementary composition of the salt, Table 15.

Residue Analyses

After filtration with the 0.22 μm Millipore filter, the residue was dried and analyzed by SEM and EDAX. The SEM photos of the residue for both DW and SW are presented in FIGS. 16a-16b—(a) DW residue (FIG. 16a), (b) SW residue (FIG. 16b).

Figure 16A:
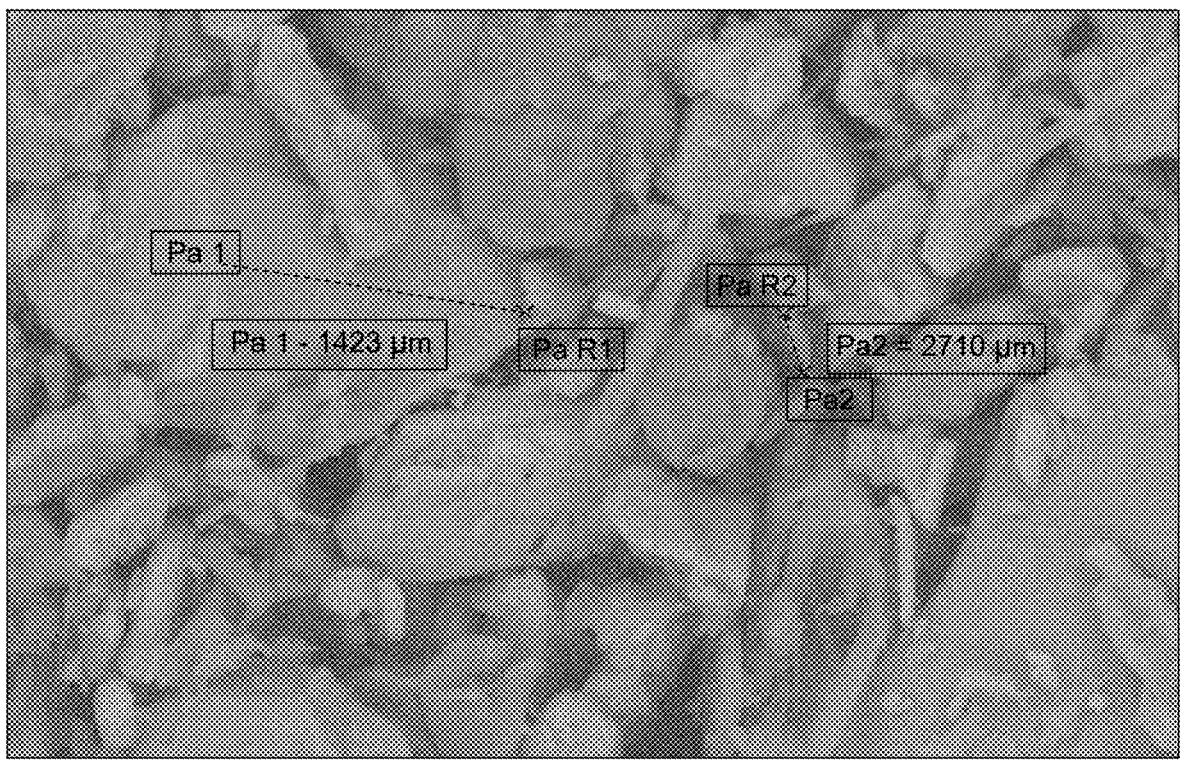
FIGS. 16a-16b depict SEM images at a magnification of 5000× of PS residue after filtration with 0.22 m Millipore filter. (a) DW residue (FIG. 16a), (b) SW residue (FIG. 16b).
Figure 16B:
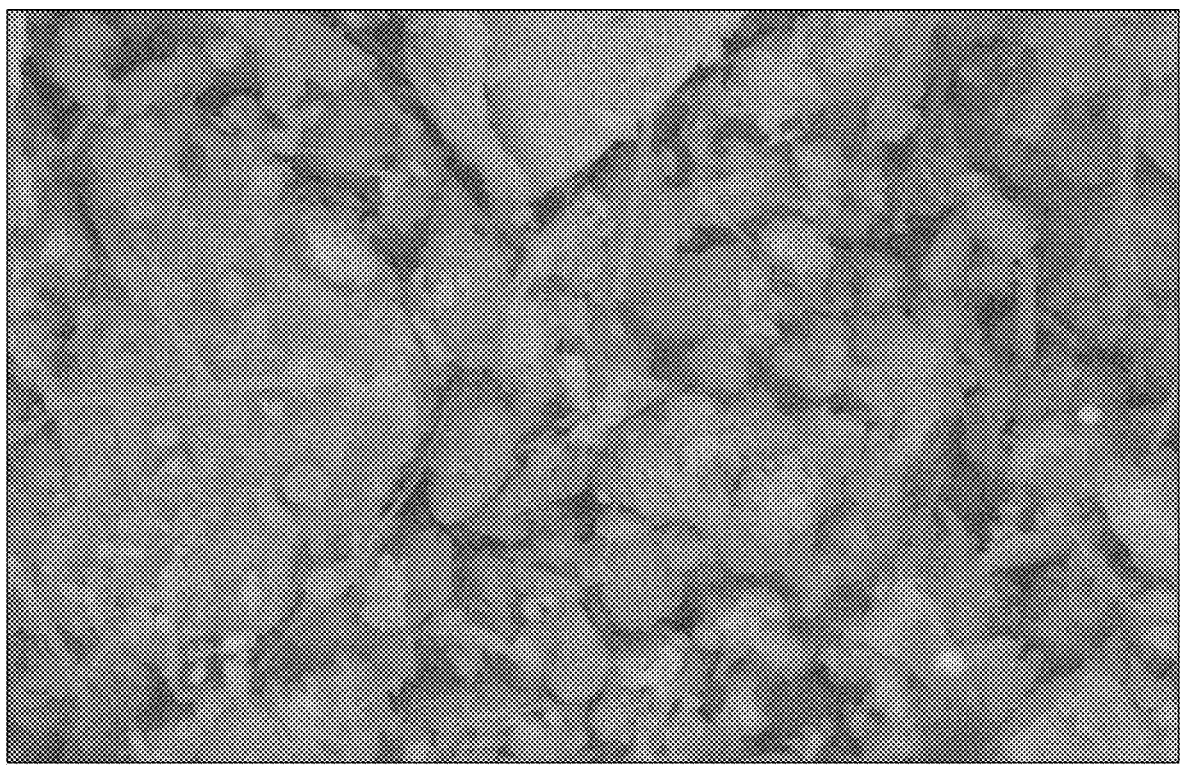

FIGS. 16a-16b depict SEM images at a magnification of 5000× of PS residue after filtration with 0.22 m Millipore filter. (a) DW residue (FIG. 16a), (b) SW residue (FIG. 16b) The particle sizes of the residue are ranging from 0.2 μm up to 30 μm. Different grain shapes were observed under the microscope. Irregular grains were the most common, but also elongated crystals appeared to be a part of the residue. in both samples. However, more small particles and the particle surfaces appear to be more worn in presence of SW.

Elemental analysis was carried out on both samples, Table 18.

TABLE 18

Cation analyses for DW and SW residues after filtration.

| Element | DW Residue Atomic weight % | SW residue Atomic weight % |
|---|---|---|
| Sodium | 7.0 | 9.3 |
| Magnesium | 11.8 | 37.5 |
| Aluminium | 0.4 | 1.9 |
| Silica | 4.3 | 14.5 |
| Potassium | 0.5 | 1.5 |
| Calcium | 42.4 | 23.9 |
| Sulfur | 33.6 | 11.4 |

The insoluble residue was dominated by calcium, potassium, and magnesium cations. On the anion side, sulphate was the main component detected. The DW residue was more calcium and sulfur rich than with SW. On the other hand, the residue with SW had more silica and aluminium. These are indications suggesting that the dissolution in SW could have been more effective.

Surface Reactivity Test

To evaluate if the ions present in DW after PS exposure could interact with a $CaCO_3$ surfaces in a porous rock system and facilitate the wettability needed for a Smart Water, a surface reactivity test were designed using Stevns Klint Chalk in line with test performed by Strand et al. (2006). The Chromatographic brines prepared is 5 g/l DW-PS brine spiked with lithium as a tracer. This brine is named DW1T, and the composition is given in Table 17. The DWOT brine were prepared in the laboratory based on the SW1T composition using reagent salts, excluding sulphate and lithium ions.

Figure 17A:
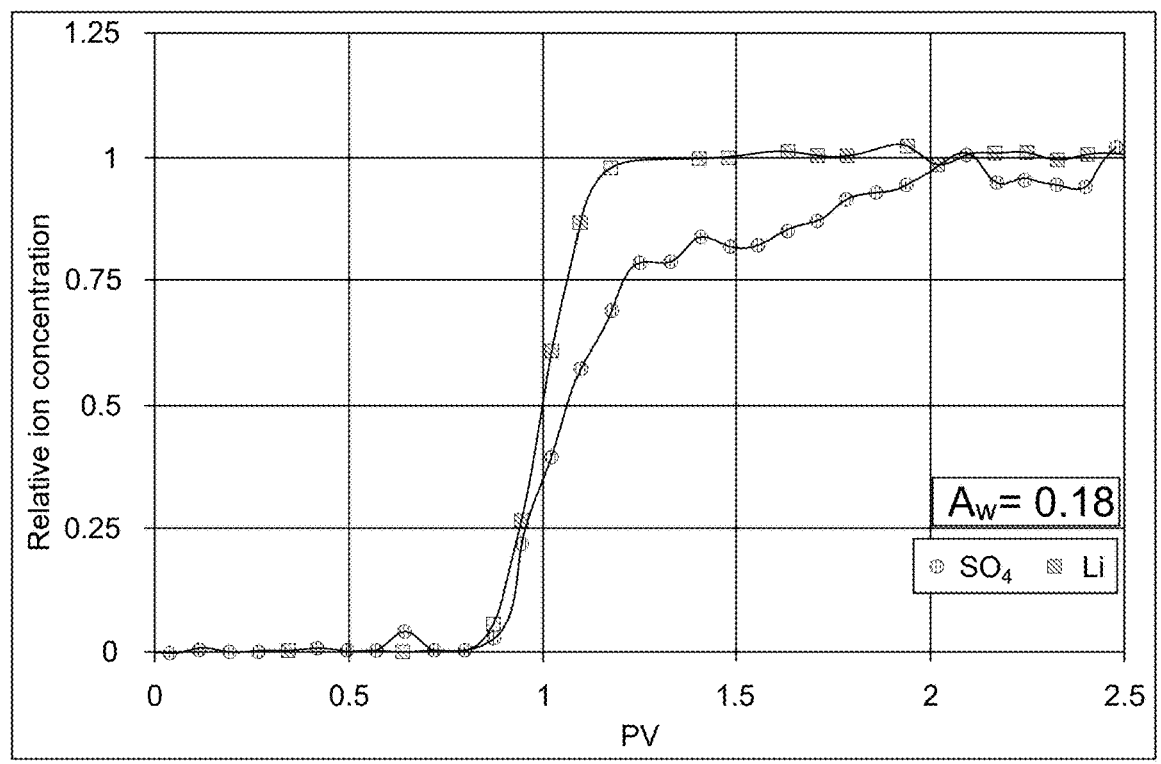
FIGS. 17a-17b depict graphs showing chromatographic separation between sulphate and lithium on Stevns Klint outcrop chalk core SK9 (a) at 23° C.
Figure 17B:
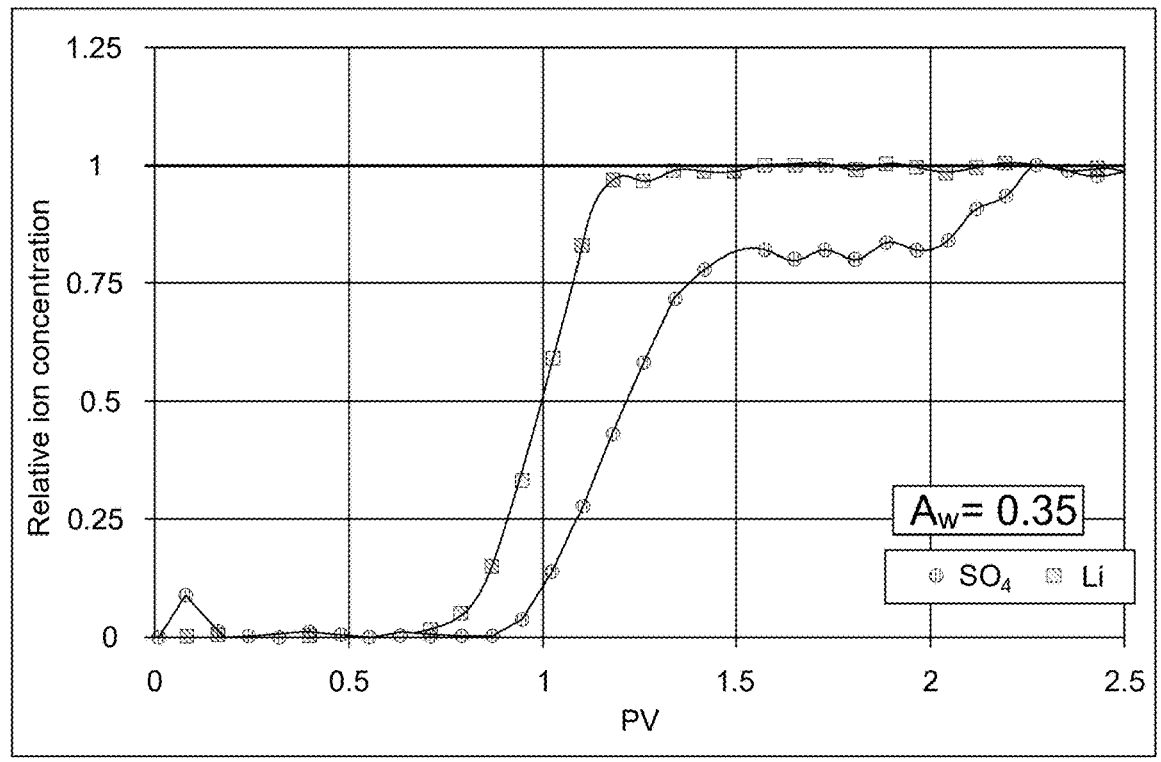

The chromatographic surface reactivity test was performed at both 23 and 90° C. using a 100% water saturated SK Chalk core SK9. The chromatographic separation between the lithium tracer and sulphate are presented in FIGS. 17a-17b. As can be seen, lithium on Stevns Mint outcrop chalk core SK9 (a) at 23° C. (FIG. 17a), and (b) at 90° C. (FIG. 17b), using DWOT at an injection rate of 0.2 ml/min followed by DW1T.

The results confirm that the sulphate ions gained from Polyhalite interact with the chalk, and the sulphate reactivity increases with increasing temperature. The first lithium tracer is observed in the effluent after 0.8 PV injected and reaches injection concentration after 1.4 PV. The increase in sulphate concentration is significantly delayed, especially for the test performed at 90° C. At 23° C. the injection concentration of sulphate was reached after 2.0 PV, while 2.2 PV at 90° C. The separation areas ($A_{cw}$) between lithium tracer and sulphate were s quantified by the trapezoidal method and increased from 0.18 at 23° C. to 0.35 at 90° C., confirming that the sulphate adsorbs towards the $CaCO_3$ surfaces and that the adsorption is temperature dependent. The increased reactivity of the sulphate ions at high temperatures could be explained by dehydration, breaking the hydrogen bond structures between water molecules surrounding the sulphate ion in solution. The results from the surface reactivity test are summarized in Table 19.

TABLE 19

Data of the surface reactivity tests.

| Temperature | 23° C. | 90° C. |
|---|---|---|
| Chromatographic separation observed | Yes | Yes |
| Area of chromatographic separation ($A_{cw}$) | 0.18 | 0.35 |

In summary, the fact of having a chromatographic separation between that $SO_4^{2-}$ and $Li^+$ reveals the potential of the DW-PS as a possible wettability modifier in carbonates Thus, it might be expected to observe increased wettability alteration and increased oil mobilization when this brine is used as Smart Water. The increased chromatographic separation at higher temperatures confirms higher reactivity at elevated temperatures, which also could result in an increased EOR potential at high reservoir temperatures.

Effect of Polyhalite on Oil Recovery

It has previous been observed that SW could significantly improve the oil recovery from mixed wet limestone and chalk cores at higher temperatures. The recovery mechanism has been verified in parametric studies, confirming that the presence of both $Ca^{2+}$ and $SO_4^{2-}$ facilitate wettability alteration towards more water wet conditions and significantly improve the oil mobilization from heterogeneous pore systems. By modifying the SW composition, more efficient Smart Water compositions could be made. Studies have shown that Smart Water could be made by increasing the concentration of $Ca^{2+}$ and $SO_4^{2-}$ in SW, or by lowering the Salinity while maintaining the $Ca^{2+}$ and $SO_4^{2-}$ concentration of SW.

In this section the effect of Polyhalite as an additive to water or brines have been investigated for designing efficient Smart Water brines for mixed wet Stevns Klint chalk cores. Stevns Mint chalk are often used as an analogue for the North Sea Chalk reservoirs. It is also important to notice that Smart Water EOR effects observed in chalk have also been confirmed in reservoir limestone systems. The water/brines used in this study is FW, DW and SW, and Smart Water brines designed by adding Polyhalite (PS) to DW and SW, resulting in their final composition as shown in Table 17.

All SK cores used herein have been equally restored with an initial water saturation, $S_{wi}$=0.1 established with FW, before oil exposure of 4 PV of Oil A. Finally, the cores were equilibrated in Oil A for at least 2 weeks to establish a more even core wettability.

Polyhalite at 90° C.

4 equally restored cores were used herein at 90° C. Spontaneous imbibition tests were performed to evaluate the restored core wettability, and to evaluate the oil mobilization potential by using different imbibition brines.

Core SK1 was exposed to formation water (FW) as the imbibing brine. FW will not facilitate any chemical induced wettability alteration as long as FW also is the initial brine. The oil production during spontaneous imbibition with FW will give the wettability and base line oil production from the restored core.

Core SK2 was imbibed with seawater (SW) as imbibing brine. SW is known to behave as a Smart water for mixed wet cores and are commonly used as injection brines for pressure support for offshore reservoirs.

The other two imbibing brines tested were distilled water with Polyhalite salt (DW-PS) and seawater spiked with Polyhalite (SW-PS). These brines are used to evaluate the effect of PS to improve the oil mobilization by wettability alteration, controlled by the presence and concentration of $Ca^{2+}$ and $SO_4^{2-}$ ions in the imbibing brine. Core SK3 were imbibed with DW-PS while SK4 were imbibed with SW-PS. A summary of the results at 90° C. is presented in FIG. 18.

Figure 18:
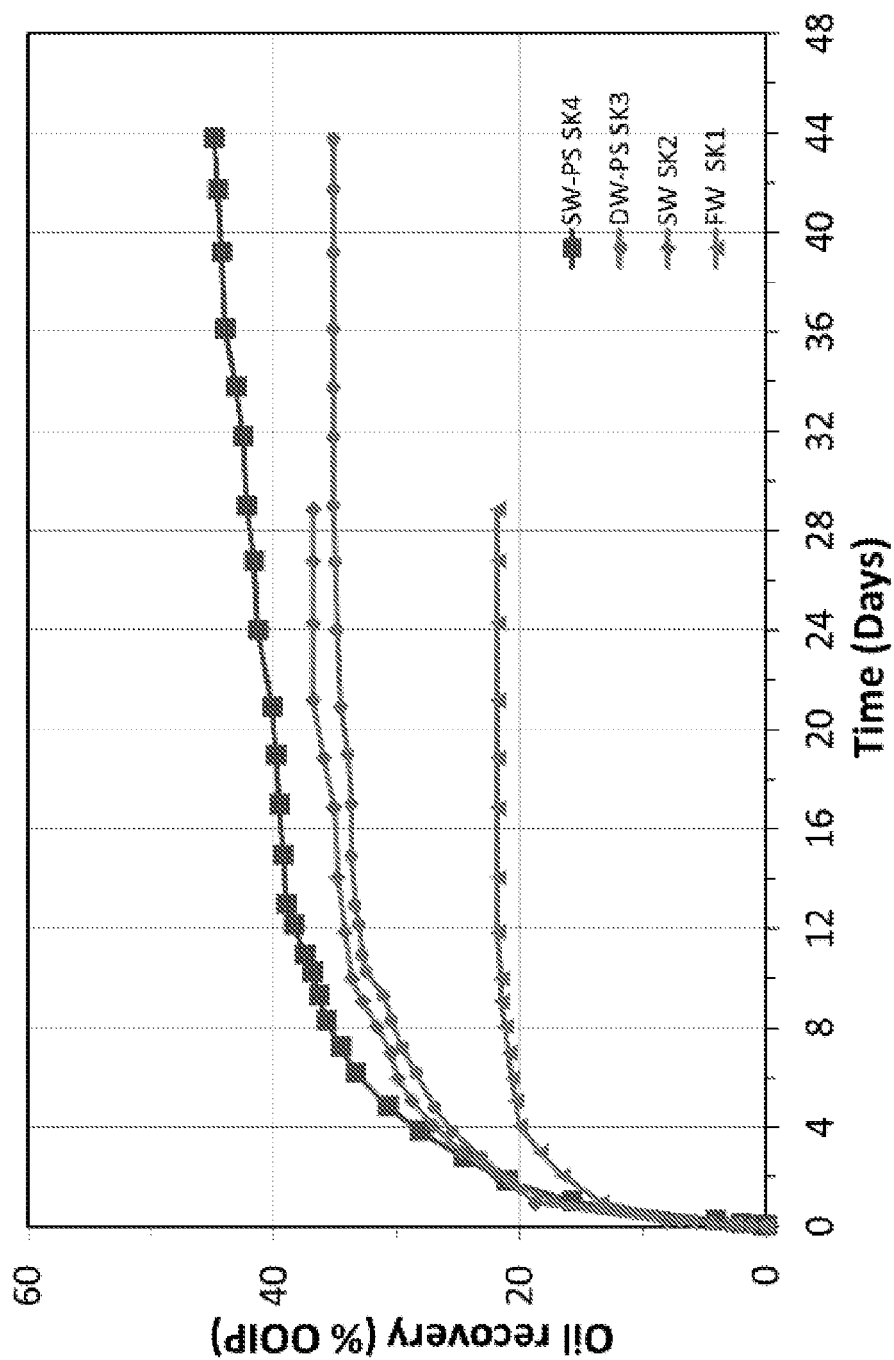
FIG. 18 is a graph depicting oil recovery tests at 90° C. by spontaneous imbibition of equally restored cores with Swi=10% and exposed to Oil core SK1 were imbibed using FW as the imbibing brine, SK2 with SW, SK3 with DW-PS and SK4 with SW-PS, in accordance with some demonstrative embodiments.

As can be seen in FIG. 18, tests exposed to Oil core SK1 were imbibed using FW as the imbibing brine, SK2 with SW, SK3 with DW-PS and SK4 with SW-PS.

FIG. 18 shows that the production plateau for core SK1 reached the ultimate recovery plateau of 22% OOIP after 12 days using FW as the imbibing brine. The small imbibition of FW confirms that the restored SK cores behave slightly water wet.

The restored core SK2 was imbibed with SW. Both the speed of imbibition and the ultimate oil recovery plateau of 37% OOIP after 21 days is a substantial improvement compared to FW. This confirms that SW induces a wettability alteration in the chalk core during the test, resulting in a significant more water wet state.

For the imbibing brines with added Polyhalite, also wettability alteration took place. Core SK3 imbibed with DW-PS reached an ultimate production plateau of 35% OOIP after 28 days, which is very close to the ultimate oil recovery for obtained for SW. The result confirms that fresh surface of aquifer water could be made Smart by adding Polyhalite in front of injection into the reservoir.

In the case of using SW-PS as imbibing brine, the ultimate recovery and speed of imbibition of core SK4 was the highest seen. An ultimate oil recovery of 45% OOIP was reached after 44 days, providing an extra 8% OOIP compared to SW. This confirms that SW could be made smarter by adding PS salts to SW in front of injection, which will increase the concentration of $SO_4^{2-}$ and $Ca^{2+}$ ions needed to induce an efficient wettability alteration.

Polyhalite at 110° C.

To evaluate the temperature effect of using Polyhalite as a Smart Water additive in Chalk, another set of equally restored SK cores were used in 4 parallel spontaneous imbibition tests at 110° C. The imbibing brines were the same as used at 90° C., FW, SW, DW-PS and SW-PS Spontaneous imbibition of the restored core SK5 with FW as imbibing brine provides the base line of oil production and wettability at 110° C., because no chemical induced wettability alteration will take place when FW is used both as initial brine during core restoration and as and the imbibition brine. SW is used as the imbibing brine on core SK6 as a reference for a Smart Water.

To evaluate the effect of Polyhalite as a Smart Water additive, DW-PS and SW-PS brines are used as imbibing brines on core SK7 and SK8 respectively. The results from the 4 spontaneous imbibition experiments at 110° C. is given in FIG. 19.

Figure 19:
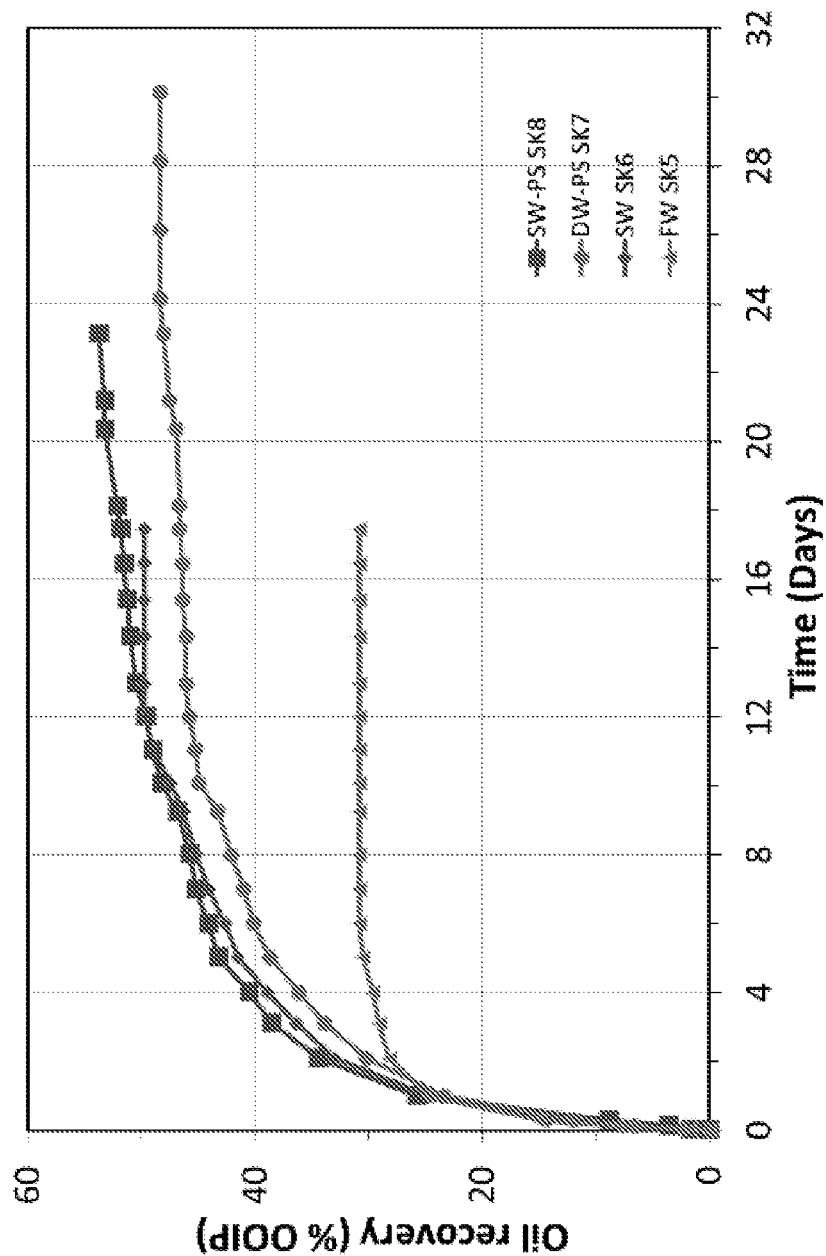
FIG. 19 is a graph depicting oil recovery by spontaneous imbibition at 110° C. in secondary mode in similarly restored outcrop cores using FW (Core SK5), SW (Core SK6), DW-PW (Core SK7), and SW-PS (Core SK8), in accordance with some demonstrative embodiments.

FIG. 19 shows the oil recovery by spontaneous imbibition at 110° C. in secondary mode in similarly restored outcrop cores using FW (Core SK5), SW (Core SK6), DW-PW (Core SK7), and SW-PS (Core SK8).

As can be seen, the oil recovery results follow the same trend as observed at 90° C., lowest oil recovery with FW and highest oil recovery with SW-PS brine. We also observe that the speed of imbibition is significantly increased when the temperature increases from 90 to 110° C. which also gives a significant increase in the ultimate oil recovery. This confirms the chemical reactivity of sulphate and calcium ion present in the Smart water brines increases with increasing temperature which also results in a significant increase in the ultimate oil mobilization from heterogeneous pore systems.

The recovery plateau with FW on core SK5 reached a recovery plateau of 31% OOIP after 5 days. SW gave an ultimate oil recovery on core SK6 of 50% OOIP after 12 days. For the imbibing brines with Polyhalite, the recovery plateau with DW-PS on core SK7 was 49% after 24 days, while SW-PS gave the highest ultimate oil recovery of 54%OOIP after 23 days on core SK8, when the experiment ceased out due to scaling in the inlet line.

Without a wettability alteration the base line oil production with FW confirms slightly water wet conditions on core SK5, in line with the experiment performed on core SK1 at 90° C. When SW was used as the imbibing brine in core SK6, the oil recovery increased from 31% OOIP with FW to 50% OOIP, which is an increase of 19% OOIP, confirming a change in core wettability giving both increased speed of imbibition and significant higher oil mobilization.

By adding Polyhalite to fresh water, DW-PS, we managed to produce a brine with Smart Water properties equal to SW. 18% OOIP extra oil were mobilized from core SK7 using DW-PS as the imbibing brine. Polyhalite added to SW significantly increased both the $Ca^{2+}$ (29.6 mM) and $SO_4^{2-}$ concentration (55.9 mM) in the SW-PS brine. The spontaneous imbibition of core SK8 with SW-PS brine, became the most efficient Smart Water brine, mobilizing 23% OOIP extra oil, 4% OOIP more than achieved with SW.

Impact of the Polyhalite on Oil Recovery

From the experimental results at 90° C. and 110° C., it is possible to conclude that the brines prepared with the Polyhalite salt are validated as wettability modifiers and could be used to produce Smart Water with significant EOR effects.

Using injection brines containing Polyhalite outperformed the system tested with FW. At 90° C. the oil mobilization was improved 61% with DW-PS, and 105% with SW-PS. Furthermore, no salt precipitation or scaling was observed in the injection or production lines during the spontaneous imbibition tests. Thus, the best performing brine in this set of experiments was the SW-PS brine At 110° C. the increment in oil mobilization in relation to FW was 57% for DW-PS, and 74% for SW-PS. Increased temperature and high concentration of $Ca^{2+}$ and $SO_4^{2-}$ in the injection brines could result in anhydrite precipitation, as observed in the injection line after 23 days for core SK8. This could explain the relative low performance of the SW-PS compared to 90° C. If Polyhalite should be used as a smart water additive for a given reservoir system, the amount of Polyhalite added need to be optimized based on reservoir temperature, bottom hole temperature in injection wells, and the ion composition of the makeup water.

Temperature Effect

Figure 6:
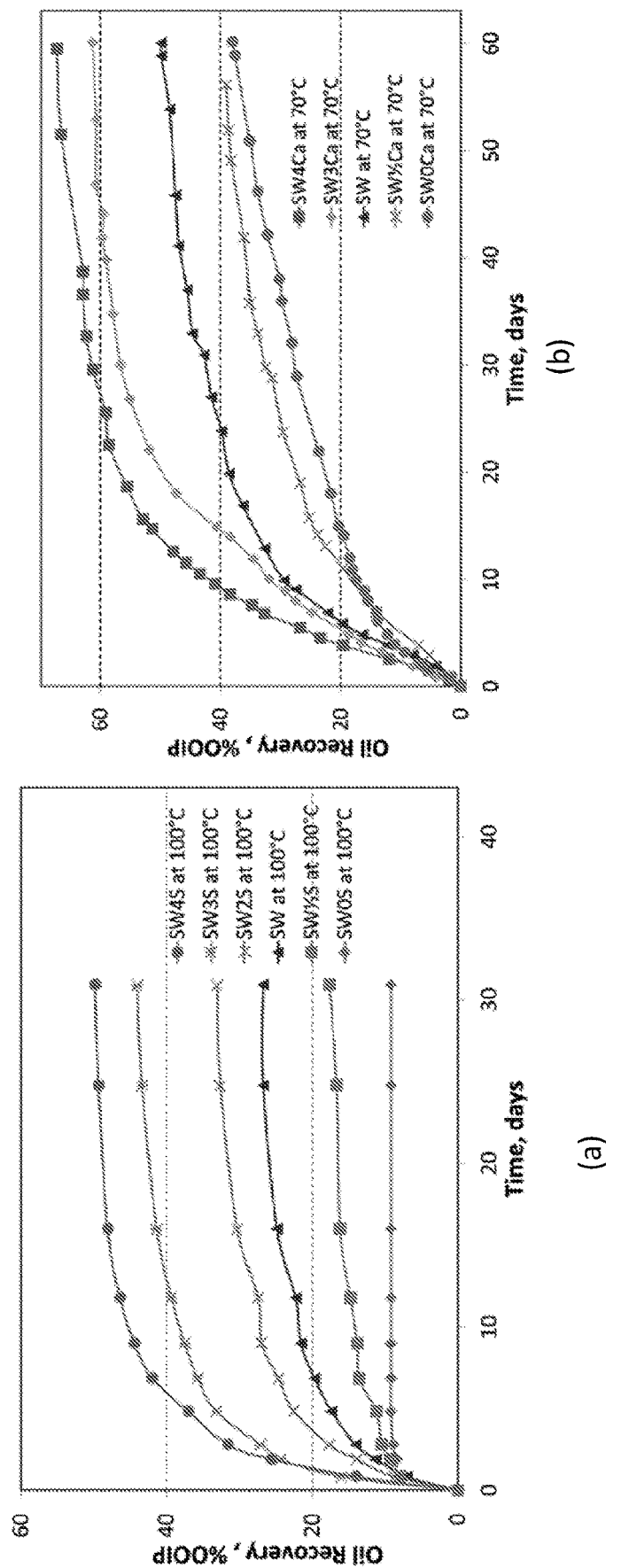
FIG. 6 is a graph representation of Spontaneous imbibition experiments on chalk, (a) a graph showing the tests at 100° C. displaying the EOR effect on Stevns Klint chalk cores by increasing sulphate concentration. (b): a graph showing the EOR effect at 70° C. on chalk cores by increasing calcium concentration, according to some demonstrative embodiments.
Figure 7:
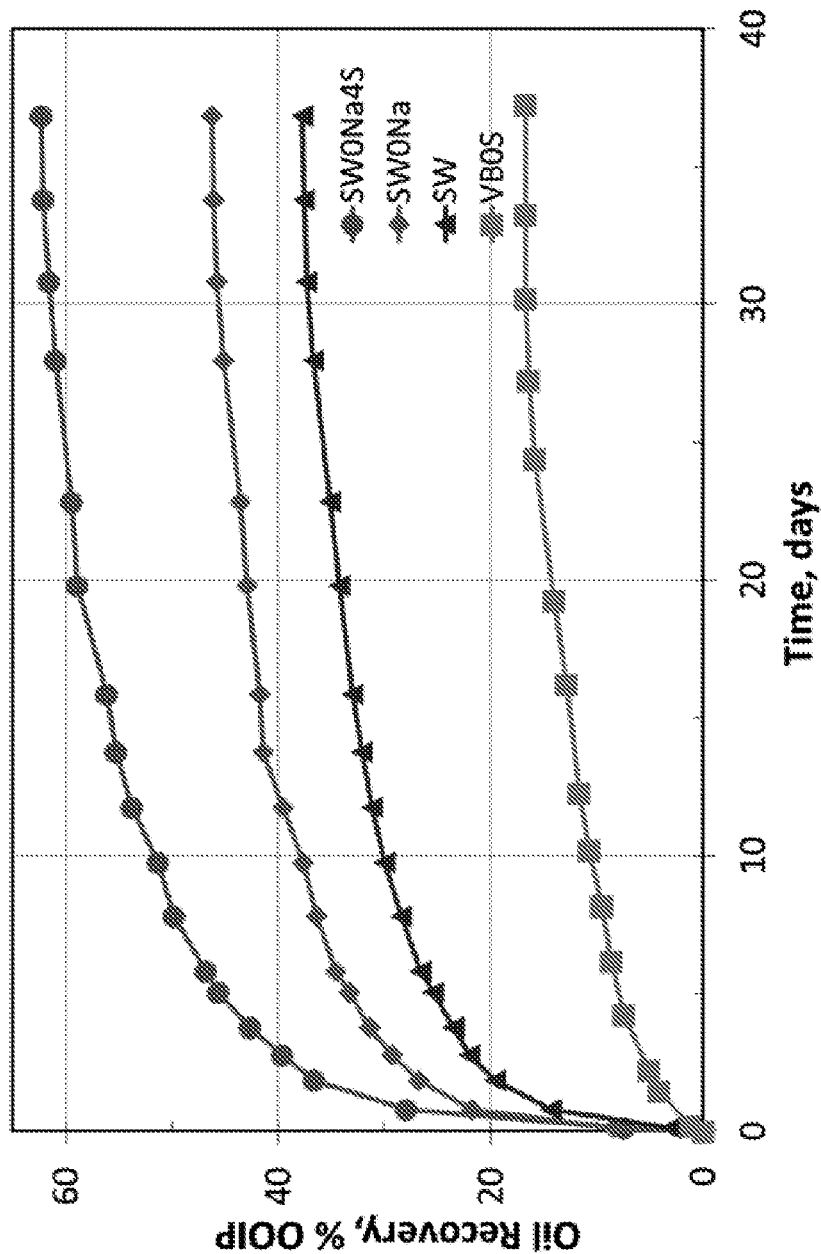
FIG. 7 is a graph representation of Spontaneous imbibition experiments on chalk, EOR effect at 90° C. on chalk cores by using VB (formation water), SW, and two modified SW brines; SW0NaCl and SW0NaCl-4SO$_4$, in accordance with some demonstrative embodiments.

Increased ion reactivity was observed with increasing temperature during the surface reactivity tests performed with the Polyhalite brine DW-PS, Figure, clearly indicating that temperature will influence the recovery potential for Polyhalite brines. This results are in line with previous reported findings. The ultimate oil recovery results shown in the spontaneous imbibition tests at 90 and 110° C., FIGS. 6-7, are systemized in Table 20.

TABLE 20

Summary of oil recovery

| Imbibition fluid | OOIP % T = 90° C. | Δ OOIP % related to FW T = 90° C. | OOIP % T = 110° C. | Δ OOIP % related to FW T = 110° C. |
|---|---|---|---|---|
| FW | 22 | — | 31 | — |
| SW | 37 | 15 | 50 | 19 |
| DW-PS | 35 | 13 | 48 | 17 |
| SW-PS | 45 | 23 | 54 | 23 |

Significant higher oil mobilization was observed at 110° C. for brines capable of inducing wettability alteration, i.e., seawater, DW-PS and SW-PS.

For SW the Δ OOIP % in relation to FW increased from 15% OOIP at 90° C. to 19% OOIP at 110° C., and for DW-PS Δ OOIP % increased from 13% OOIP at 90° C. to 17% OOIP at 110° C., Table 20.

For SW-PS the Δ OOIP % of 23% OOIP at 90° C. did not increase when the temperature increased to 110° C., most likely due to $CaSO_4$ precipitation which will reduce the effective concentration of $Ca^{2+}$ and $SO_4^{2-}$ needed for the wettability alteration.

According to some embodiments, the potential to use Polyhalite as an additive exists, and yes it can be an implementable alterative to other EOR alternatives.

It is important to note that the recoveries observed for DW-PS were very similar to the ones observed with seawater, this opens the possibility of using this mineral in oil recovery, for example, in carbonate fields where access to seawater is limited. The results with SW-PS showed that increased sulphate and calcium concentrations can lead to higher recoveries. Thus, it would be important to maximize their content but trying to stay below their concentration threshold to not trigger significant scale issues.

Another benefit of using the Polyhalite salt is linked to improvement of current water management strategies. For example, Polyhalite salts can be applied to minimize the use of expensive filtration systems, i.e., reverse osmosis or nano-filtration when specific water compositions are required. This type of field operations creates a demand for reliable industrial processes with low maintenance costs, assure stable concentration of the injection fluid, to make the oil production operations more reliable and predictable.

According to some embodiments, the present invention comprises using a solution comprising Polyhalite brines as a new additive for Smart Water processes in carbonates.

According to some embodiments, the present invention combines chemical and physicochemical characterization and wettability studies by chromatographic and spontaneous imbibition tests. The rock material used was Stevns Klint outcrop chalk which is commonly used for parametric studies for wettability studies in carbonates. SI tests were performed at 90 and 110° C., using as imbibing brines FW, SW, DW-PS and SW-PS, with the latter two containing the Polyhalite salt. The conclusions derived from this work are presented below.

The chromatographic wettability tests suggested that there was potential for wettability alteration by using a Polyhalite based brine.

The chromatographic separation area increased from 0.18 to 0.35 by increasing the temperature from 25° C. to 90° C., confirming an increased reactivity of sulphate as the temperature was elevated.

The Polyhalite salt was dissolved in seawater and distilled water. The solubility of the Polyhalite salt under different brines appeared to be rather high, with more than a 95% of the salts used being fully dissolved at a concentration of 5 g/l. By mixing Polyhalite salt with DW and SW, the three determining ions $Mg^{2+}$, $Ca^{2+}$ and $SO_4^{2-}$ were incorporated into these solutions.

During the SI tests FW recovered 22% and 31% OOIP at 90 and 110° C. respectively, these results set the lowest oil production baseline since no wettability alteration was induced in these tests.

Wettability alteration was confirmed by using DW-PS and SW-PS as they recovered more oil than that observed with FW, at 90° C. the improvement in oil production with DW-PS was 61% and for SW-PS was 105% relative to FW. At the temperature of 110° C. the increment for the brine DW-PS in relation to FW was 57%, and for SW-PS it was observed an increment of 74%.

Precipitation was observed at 110° C. with the SW-PS brine, it occurred at the inlet line of the spontaneous cell, however its ultimate oil recovery was the highest observed, 54% OOIP.

The performance of DW-PS at both 110° C. and 90° C. were very similar to those observed with SW, providing an opportunity to obtain an injection brine with similar efficacy to SW for onshore fields where there is limited or restricted access to SW.

While the invention has been described with respect to a limited number of embodiments, it will be appreciated that many variations, modifications and other applications of the invention may be made.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove.

The invention claimed is:

1. A liquid solution for the recovery of oil from carbonate reservoirs, comprising:
    a solid chemical composition comprising:
        Polyhalite in a weight range of 70 to 94.9%;
        NaCl in a weight range of 5 to 29.9%; and
        $SiO_2$ in a weight range of 0.1 to 5%; and
    water selected from the group consisting of sea water, diluted sea water, desalinated seawater, produced water, aquifer water, river water, surface water, fresh water, distilled water or a combination thereof,
    wherein said solid chemical composition is dissolved in said water in an amount of 1-10 grams of said solid chemical composition per 1 liter of said water.

2. The liquid solution of claim 1, wherein said water is a low salinity water selected from the group consisting of surface water, fresh water, distilled water or a combination of thereof, wherein said low salinity water comprises a TDS of 0.4% or less.

3. The liquid solution of claim 1, comprising a dissolved chloride concentration of less than 1500 mg/L and a dissolved sodium concentration of less than 1000 mg/L.

4. The liquid solution of claim 3, wherein said dissolved chloride concentration is less than 600 mg/L and said dissolved sodium concentration is less than 300 mg/L.

5. The liquid solution of claim 1, further comprising bivalent salts of magnesium sulphate or calcium sulphate.

6. A method for recovering oil from a carbonate reservoir, comprising:
    dissolving 1-10 grams of a solid chemical composition in 1 liter of low salinity water comprising a TDS of 0.4% or less to yield a recovery solution; and
    injecting said recovery solution to said reservoir to facilitate oil recovery,
    wherein said solid chemical composition comprises:
    Polyhalite in a weight range of 70 to 94.9%;
    NaCl in a weight range of 5 to 29.9%; and
    $SiO_2$ in a weight range of 0.1 to 5%, wherein said injected recovery solution is collected from said carbonate reservoir and includes oil recovered from said carbonate reservoir.

7. The method of claim 6, further comprising heating said recovery solution to a temperature of between 30-130 degrees Celsius prior to injecting said recovery solution to said carbonate reservoir.

* * * * *